(12) United States Patent
Mellor et al.

(10) Patent No.: US 10,365,719 B2
(45) Date of Patent: Jul. 30, 2019

(54) HAPTIC FEEDBACK OF USER INTERFACE SCROLLING WITH SYNCHRONIZED VISUAL ANIMATION COMPONENTS

(71) Applicant: Google LLC, Mountain View, CA (US)

(72) Inventors: Madeleine Mellor, San Francisco, CA (US); Shumin Zhai, Los Altos, CA (US); Seungyon (Claire) Lee, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 15/660,773

(22) Filed: Jul. 26, 2017

(65) Prior Publication Data

US 2019/0033970 A1 Jan. 31, 2019

(51) Int. Cl.
*G06F 3/01* (2006.01)
*G06F 3/0485* (2013.01)
*G06F 3/0482* (2013.01)
*G06F 3/0488* (2013.01)
*H04L 12/58* (2006.01)
*G06T 13/80* (2011.01)

(52) U.S. Cl.
CPC ............ *G06F 3/016* (2013.01); *G06F 3/0482* (2013.01); *G06F 3/0485* (2013.01); *G06F 3/04886* (2013.01); *H04L 51/10* (2013.01); *G06F 3/0488* (2013.01); *G06T 13/80* (2013.01)

(58) Field of Classification Search
CPC ...... G06F 3/016; G06F 3/0485; G06F 3/0488; G06T 13/80
See application file for complete search history.

(56) References Cited

U.S. PATENT DOCUMENTS

| | | | |
|---|---|---|---|
| 2008/0024459 A1 | 1/2008 | Poupyrev et al. | |
| 2008/0180408 A1* | 7/2008 | Forstall | G06F 3/0482 345/177 |
| 2009/0191946 A1* | 7/2009 | Thomas | G07F 17/32 463/20 |

(Continued)

FOREIGN PATENT DOCUMENTS

WO 2009/085060 7/2009

OTHER PUBLICATIONS

Precision Microdrives Limited, "What Vibration Frequency is Best for Haptic Feedback?", Feb. 27, 2014, available via the Internet at www.precisionmicrodrives.com/tech-blog/2014/02/27/what-vibration-frequency-best-haptic-feedback (last visited Jun. 11, 2017).

(Continued)

*Primary Examiner* — Tadesse Hailu
(74) *Attorney, Agent, or Firm* — McDonnell Boehnen Hulbert & Berghoff LLP

(57) ABSTRACT

Apparatus and methods related to visual and haptic feedback on mobile devices are provided. A computing device can present a symbol queue that includes a particular symbol on a screen. The computing device can receive user input to move through the symbol queue. In response to the user input, the computing device can: animate the particular symbol on the screen by at least presenting an expanded item display that includes at least the particular symbol and a particular informational item associated with the particular symbol, and generate haptic feedback that is synchronized with animating the particular symbol on the screen.

22 Claims, 11 Drawing Sheets

(56) References Cited

U.S. PATENT DOCUMENTS

| | | | |
|---|---|---|---|
| 2009/0249247 A1 | 10/2009 | Tseng et al. | |
| 2010/0004033 A1* | 1/2010 | Choe | G06F 1/1626 455/567 |
| 2011/0157052 A1* | 6/2011 | Lee | G06F 1/1626 345/173 |
| 2011/0225539 A1* | 9/2011 | Lee | G06F 3/0485 715/784 |
| 2011/0273379 A1* | 11/2011 | Chen | G06F 3/04883 345/173 |
| 2012/0102455 A1* | 4/2012 | Ambat | G06F 9/45558 717/115 |
| 2012/0223880 A1* | 9/2012 | Birnbaum | G06F 3/015 345/156 |
| 2013/0169424 A1* | 7/2013 | Kujawski | G06F 3/03543 340/407.2 |
| 2013/0222269 A1* | 8/2013 | Lindsay | H04M 1/274583 345/173 |
| 2014/0139471 A1* | 5/2014 | Matsuki | G06F 3/0485 345/173 |
| 2014/0176455 A1* | 6/2014 | Araki | G06F 3/016 345/173 |
| 2014/0189608 A1 | 7/2014 | Shuttleworth et al. | |
| 2014/0210756 A1* | 7/2014 | Lee | G06F 3/016 345/173 |
| 2014/0340316 A1* | 11/2014 | Gu | G06F 3/016 345/173 |
| 2014/0351698 A1* | 11/2014 | Nakagawa | G06F 3/0485 715/702 |
| 2014/0354570 A1* | 12/2014 | Makinen | G06F 3/041 345/173 |
| 2015/0301697 A1 | 10/2015 | Petrell et al. | |
| 2016/0364107 A1 | 12/2016 | Yim et al. | |
| 2017/0357320 A1* | 12/2017 | Chaudhri | G06F 3/0412 |
| 2017/0357398 A1* | 12/2017 | Alonso-Ruiz | G06F 3/04817 |

OTHER PUBLICATIONS

International Searching Authority, International Search Report and Written Opinion for PCT Pat. App. No. PCT/US2018/023892, dated Jul. 11, 2018.

A. Martonik, "Android L preview: Notifications and lockscreen", Jun. 26, 2014, retrieved from the Internet at www.androidcentral.com/android-I-preview-notifications-and-lockscreen (retireved Jul. 2, 2018).

* cited by examiner

1100

1110 Present a symbol queue on a screen of a computing device, the symbol queue including a particular symbol

1120 Receive, at the computing device, user input to move through the symbol queue

1130 In response to the user input, animate the particular symbol on the screen by at least presenting at least one of an expanded item display that includes the particular symbol and a particular informational item associated with the particular symbol

1140 Generate haptic feedback that is synchronized with animating the particular symbol on the screen

FIG. 11

HAPTIC FEEDBACK OF USER INTERFACE SCROLLING WITH SYNCHRONIZED VISUAL ANIMATION COMPONENTS

BACKGROUND

Many modern computing devices, including mobile phones, personal computers, and tablets, provide graphical user interfaces (GUIs) for permitting users to interact with the computing device. For example, application programs can use the GUI to communicate with a user using images, text, and graphical elements such as windows, dialogs, pop-ups, images, buttons, scrollbars, and icons. The GUI can also receive inputs from user-interface devices such as touch screens, computer mice, keyboards, and other user-interface devices to permit the user to control the GUI, and thus the application program.

In some cases, the GUI can be used to interact with an operating system (OS) to manage the computing device. For example, the OS can have a control panel or setting application that uses the GUI to draw one or more windows related to control settings for some aspects of the computing device, such as audio controls, video outputs, computer memory, and human languages used by the OS (e.g., choose to receive information in English, French, Mandarin, Hindi, Russian, etc.). The control panel/settings application can receive subsequent input related to the windows using the GUI. The GUI can provide the inputs to the OS, via the control panel/settings application, to manage the computing device.

SUMMARY

In one aspect, a method is provided. A symbol queue is presented on a screen of a computing device. The symbol queue includes a particular symbol. The computing device receives user input to move through the symbol queue. In response to the user input, the particular symbol is animated on the screen by at least presenting an expanded item display that includes the particular symbol and a particular informational item associated with the particular symbol. Haptic feedback is generated that is synchronized with animating the particular symbol on the screen.

In another aspect, a computing device is provided. The computing device includes one or more processors, a screen, and data storage. The data storage includes at least computer-executable instructions stored thereon that, when executed by the one or more processors, cause the computing device to perform functions. The functions include: presenting a symbol queue on the screen, the symbol queue including a particular symbol; receiving user input to move through the symbol queue; in response to the user input, animating the particular symbol on the screen by at least presenting an expanded item display that includes the particular symbol and a particular informational item associated with the particular symbol; and generating haptic feedback that is synchronized with animating the particular symbol on the screen.

In another aspect, a non-transitory computer readable medium is provided. The non-transitory computer readable medium has stored thereon instructions, that when executed by one or more processors of a computing device, cause the computing device to perform functions. The functions include: presenting a symbol queue on a screen of the computing device, the symbol queue including a particular symbol; receiving user input to move through the symbol queue; in response to the user input, animating the particular symbol on the screen by at least presenting an expanded item display that includes the particular symbol and a particular informational item associated with the particular symbol; and generating haptic feedback that is synchronized with animating the particular symbol on the screen.

In another aspect, a computing device is provided. The computing device includes: means for presenting a symbol queue on a screen of the computing device, the symbol queue including a particular symbol; means for receiving user input to move through the symbol queue; means for, in response to the user input, animating the particular symbol on the screen by at least presenting an expanded item display that includes the particular symbol and a particular informational item associated with the particular symbol; and means for generating haptic feedback that is synchronized with animating the particular symbol on the screen.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 11 is a flowchart of a method, in accordance with an example embodiment.

DETAILED DESCRIPTION

Figure 1:
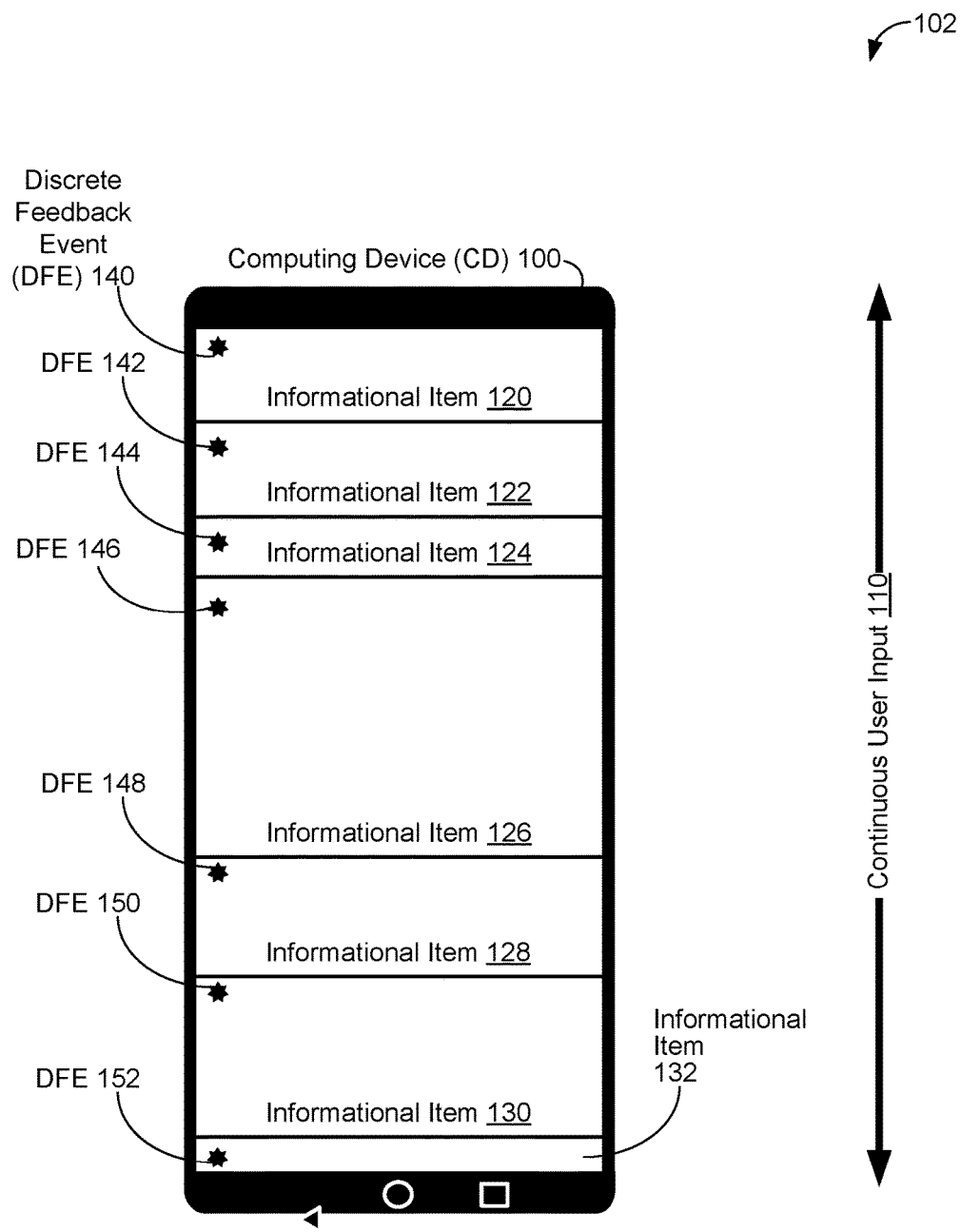
FIG. 1 shows a scenario where a computing device provides discrete feedback events in response to continuous user input, in accordance with an example embodiment.

User Interface Scrolling with Synchronized Animation and Haptic Feedback

A computing device can have one or more interfaces, such as screens, touch interfaces, computer mice, and keyboards, for receiving and providing information to a user of the computing device. For example, a mobile computing device can have a touch screen that both receives touch-based inputs from a user and displays text and images to the user. Mobile computing devices can use touch-based interfaces to enable user navigation of displayed information. For example, a touch screen of a mobile computing device can accept swipe-up and swipe-down (or swipe-left and swipe-right) touch inputs to control scrolling through a displayed list of objects.

Many computing devices have actuators for providing haptic feedback, such as a haptic "pulse" generated when a message arrives at a computing device operating in a do-notdisturb mode. Haptic feedback can also be used in other scenarios, such as in providing tap and press feedback for virtual keyboards.

Haptic feedback can be provided during user navigation of information, such as haptic feedback provided while scrolling through lists of informational items. For example, an item display region and a symbol queue can be presented on a screen of a mobile computing device, where the item display region can display one or more informational items, and where the symbol queue includes one or more symbols related to one or more informational items. In some examples, the item display region can be visually distinct from the symbol queue.

As used herein, an informational item can include information relating to one or more of: receipt of one or more messages, sending one or more messages, availability of one or more software downloads, a reminder of an event, one or more particular locations, one or more particular persons and/or entities, and one or more particular computing devices. Also, as used herein, a symbol can be one or more characters, letters, numbers, punctuation marks, images, figures, icons, logos, emojis, patterns, and/or other visual representations.

The computing device can receive user input to scroll through the informational items as displayed in the item display region. The user input to scroll through informational items in the item display region can include touch input; e.g., touch inputs received via a touch screen or other touch interface. In some examples, user input to scroll through informational items in the item display region includes one or more of: user input to scroll up in the item display region and user input to scroll down in the item display region.

The computing device can animate symbols in the symbol queue and provide synchronized haptic feedback while scrolling through the informational items in accord with the user input. In response to the user input, a particular symbol can be animated on the screen by at least presenting an expanded item display that includes the particular symbol and a particular informational item associated with the particular symbol. For example, an informational item, such as an e-mail message, can be associated with a related symbol, such as an image of an envelope or a first character of a name associated with the e-mail message; e.g., a first character of a sender's name As a more particular example, user input can cause the computing device to add (or remove) an informational item to the item display region. Then, haptic feedback can be provided while an expanded item display for the informational item is being added to (or removed from) the item display region; e.g., at or near a time the expanded item display is added to (or removed from) the item display region. At the same time the expanded item display is being added (removed), the computing device can generate displays showing a symbol corresponding to the added (removed) informational item being moved out of (into) the symbol queue and subsequently appearing in the added expanded item display (not appearing in the removed expanded item display), thereby animating the symbol. As the animation of the symbol occurs while the added (removed) expanded item display is being added (removed), the haptic feedback is synchronized with animating the symbol.

In examples where the user input is for scrolling informational items up, animating the particular symbol can include pulling the particular symbol out of the symbol queue. In examples where the user input is for scrolling informational items down, animating the particular symbol can include putting the particular symbol back into the symbol queue. The user input to scroll through informational items in the item display region can effectively scroll through symbols in the symbol queue. As input is received to scroll through the informational items in the item display region, the above-mentioned animations of symbols in the symbol queue lead to pulling and pushing items in and out of the symbol queue, thereby scrolling symbols in the symbol queue.

More particularly, the computing device can display a symbol S1 in the symbol queue, where symbol S1 represents an informational item I1 that is not yet displayed in the item display region. Then, user input can be received to scroll up through the list of informational items to display informational item I1 in the item display region. Upon determining to display informational item I1 in the item display region, the computing device can animate symbol S1 by providing displays that effectively pull symbol S1 out of the symbol queue by: removing symbol S1 from the symbol queue, shifting any remaining symbols in the symbol queue to take the place of symbol S1, and showing informational item I1 with a representation of symbol S1 in the item display region. The computing device can provide haptic feedback at one or more predetermined times during the animation of symbol S1; e.g., at the beginning of the animation, at the end of the animation, at a time between the beginning and the end of the animation.

Continuing this example, the computing device can later receive user input to scroll down through the list of informational items to remove a display of informational item I1 in the item display region. Upon determining to remove the display informational item I1 in the item display region, the computing device can animate symbol S1 by providing displays that effectively put symbol S1 into the symbol queue by: shifting symbols in the symbol queue to create a space for symbol S1 in the symbol queue, adding symbol S1 to the space in the symbol queue, and removing display of informational item I1 from the item display region.

The computing device can provide haptic feedback at one or more predetermined times during the animation of a symbol; e.g., at the beginning of the animation, at the end of the animation, at a time between the beginning and the end of the animation. In some examples, the haptic feedback can include one or more haptic pulses, where a haptic pulse can be a subtle, short (e.g., 10 milliseconds or less) burst of output of a haptic actuator. In other examples, a first haptic feedback can be associated with user input to scroll up in the symbol queue, and a second haptic feedback is associated with the user input to scroll down in the symbol queue. In particular, a "haptic tone" of the haptic feedback can increase or decrease as user input is received to scroll through (either down or up) the scrolled list. A change in haptic tone can be achieved by a combination of actuation intensity, frequency, and/or duration of haptic feedback provided by a haptic actuator of a computing device. In still other examples, the computing device provides synchronized visual, haptic, and audible feedback while navigating through information, such as when the symbol is animated when being added to and/or removed from a displayed portion of the scrolled list.

Animating the particular symbol on the screen can include updating the display of the symbol queue in coordination with continuously scrolling the expanded items in the item display region. Then generating haptic feedback that is synchronized with animating the particular symbol on the screen can first include continuously scrolling one or more expanded items in the item display region. After determining that the number of expanded items scrolled in the items display region exceeds a threshold amount (e.g., a threshold of 1, 2, 3 or more expanded items have been scrolled), then the computing device can generate the haptic feedback. In other examples, generating haptic feedback that is synchronized with animating the particular symbol on the screen can include: continuously scrolling the expanded items by a scrolling distance within the item display region and determining that the scrolling distance exceeds a threshold scrolling distance. The threshold scrolling distance can be associated with user input to scroll a display by a pre-determined number (such as 10, 20, 50, 100, 250, 333, or 1000) of pixels and/or user input to scroll a pre-determined number (such as 1, 2, 3, or more) of informational items. Then, in response to determining the scrolling distance exceeds the threshold scrolling distance, the computing device can generate the haptic feedback.

Providing haptic feedback while moving through lists of informational items can make for a richer and more engaging user experience, as visual animations and haptic feedback can mutually reinforce and enhance each other. That is, visual changes caused by animations set an expectation for haptic effects, which intensifies actual haptic feedback. Conversely, haptic feedback makes the visual changes more noticeable.

Techniques for Providing Animations and Synchronized Haptic Feedback

FIG. 1 shows scenario 102 where computing device 100 provides discrete feedback events 140, 142, 144, 146, 148, 150, 152 in response to continuous user input 110, in accordance with an example embodiment. Examples of continuous user input 110 include, but are not limited to, one or more inputs provided by a user that are each unbroken and/or uninterrupted over a duration of time (i.e., continuous) and are each received at computing device 110 using one or more touch screens, computer mice, touch pads, joysticks, and/or other user interface devices.

In scenario 102, a user provides continuous user input 110 to scroll through a list of informational items that includes informational items 120, 122, 124, 126, 128, 130, 132. FIG. 1 shows continuous user input 110 as being vertically oriented (i.e., oriented up and down); other examples of continuous user input 110 can be horizontally oriented (i.e., oriented left and right or side-to-side), or oriented along one or more other axes. In response to continuous user input 110 to display informational items 120, 122, 124, 126, 128, 130, and 132, computing device 100 can generate respective discrete feedback events (DFEs) 140, 142, 144, 146, 148, 150, and 152.

Computing device 100 can generate each of discrete feedback events 140-152 in response to the user providing enough of continuous user input 110 to exceed a threshold amount of input. In scenario 102, computing device 100 generates each of discrete feedback events 140-152 after a threshold amount of scrolling is performed by computing device 100, where the threshold amount of scrolling is an amount of scrolling to scroll through one informational item starting at a point slightly after the informational item has been displayed. For example, FIG. 1 indicates that each of discrete feedback events 140, 142, 144, 146, 148, and 150 was provided slightly after each of respective informational items 120, 122, 124, 126, 128, and 130 was begun to be displayed in response to continuous user input 110.

Note that, in this example, discrete feedback event 152 informs the user that informational item 132 has begun to be displayed, not that informational item 132 has been completely displayed. To inform the user that informational item 132 has been completely displayed, computing device 100 can provide another discrete feedback event when (or just before) that informational item 132 has been completely displayed or instead provide discrete feedback event 152 when (or just before) informational item 132 has been completely displayed.

A discrete feedback event can include visual, haptic, and/or audible feedback. The combination of different kinds of feedback can provide both a more immersive experience while using computing device 100 and provide feedback to alert a user to occurrence of an event (i.e., display of an informational item) that the user may unaware of. For example, suppose the user is scrolling through the list of informational items using finger movements on a touch screen of computing device 100, where the touch screen also displays the list of informational items. Then, the user may not be looking at the touch screen while the informational items are displayed or the user's hand may obscure the user's view of the touch screen. As such, the user may be unaware than another informational item has been displayed by visual feedback alone.

Haptic feedback can inform the user that another informational item has been displayed even if the user misses visual and/or audible feedback. In particular, haptic feedback can be particularly effective when a user is in contact with the touch screen of computing device 100; e.g., while providing touch-based user input. Also, audible feedback can further inform the user that another informational item has been displayed even when the user is unable to see part or all of the touch screen. Further, a discrete feedback event providing visual, haptic, and/or audible feedback can inform the user that the user has provided sufficient scrolling input to display an informational item and so enable the user to stop scrolling as soon as the informational item is displayed. In addition, haptic feedback can be particularly useful in notifying a user that an informational item has been displayed (or removed from display) when the informational items have variable lengths, such as shown in FIG. 1.

Discrete feedback events can change progressively while scrolling; e.g., change progressively based on an amount of scrolling that has occurred. For example, a haptic tone of haptic feedback provided in one or more discrete feedback events can increase or decrease in a progressive or continuous fashion; e.g., as continuous user input 110 continues in duration, haptic tone can correspondingly increase or decrease. A change in haptic tone can be achieved by a change of one or more of actuation intensity, frequency, and/or duration of haptic feedback provided by a haptic actuator of a computing device. The haptic tone can increase or decrease incrementally as user input is received to scroll through (either down or up) the scrolled list. For example, the haptic tone can increase (or decrease) from an initial haptic tone as long as scrolling continues on one direction (up or down) and then be reset to the initial haptic tone when scrolling is stopped. As another example, the haptic tone can increase while scrolling down and can decrease while scrolling up (or vice versa). In a further example, the haptic tone can increase incrementally as an incremental amount of scrolling, such one incremental change in haptic tone after scrolling past one displayable item or one page of text. Other changes in haptic tone are possible.

In some examples, such as discussed below in the context of FIGS. 2-6, a display of informational items can be displayed with a symbol queue, where symbols in the symbol queue can represent currently-not-displayed informational items. The symbols can be arranged in the symbol queue in an order that the currently-not-displayed informational items would be presented if user input 110 directs computing device 100 to display these currently-not-displayed informational items. Then the user may want to expand an informational item associated with a chosen symbol that shown N>0 symbols back in the symbol queue. By providing N successive discrete feedback events as the user scrolls to the chosen symbol, computing device 100 enables the user to quickly reach the chosen symbol, and therefore display a related informational item of interest, by providing a correct amount of (i.e., not too much and not too little) user input 110.

FIG. 1 shows that discrete feedback events 140-152 are provided shortly after each of related informational items 120-132 are displayed by computing device 100 regardless of a direction of continuous user input. In other examples, discrete feedback events differ depending on the direction of continuous user input. For example, discrete feedback events 140-152 can be provided at a beginning of a display of respective informational items 120-132 when scrolling downward to indicate that a new informational item has just been displayed, but a discrete feedback event can be provided when scrolling upward as an end of an informational item is no longer displayed. That is, a discrete feedback event can be provided when a boundary of an informational item has been just been crossed in either scrolling direction of continuous user input 110, i.e., a discrete feedback event is provided just after adding a new informational item when scrolling down, or a discrete feedback event is provided just after removing an already-displayed informational item when scrolling up. Other aspects of discrete feedback events than timing can differ based on the direction of user input, such as different visual, haptic, and/or audible aspects of feedback.

In related scenarios, discrete feedback can be provided after a predetermined number of discrete user inputs and/or continuous user input that relates to the predetermined number of items, such as the informational items shown in FIG. 1. For example, computing device 100 can provide a discrete feedback event after every N1>1 informational items are displayed in response to user inputs, such as continuous user input 110 and/or discrete user inputs, such as button and/or key presses, mouse clicks, finger taps; after every N2>1 discrete user inputs are received, after every N3>0 seconds of continuous user input, such as continuous user input 110, are received, and/or after another measure related to continuous and/or discrete user inputs.

Figure 2:
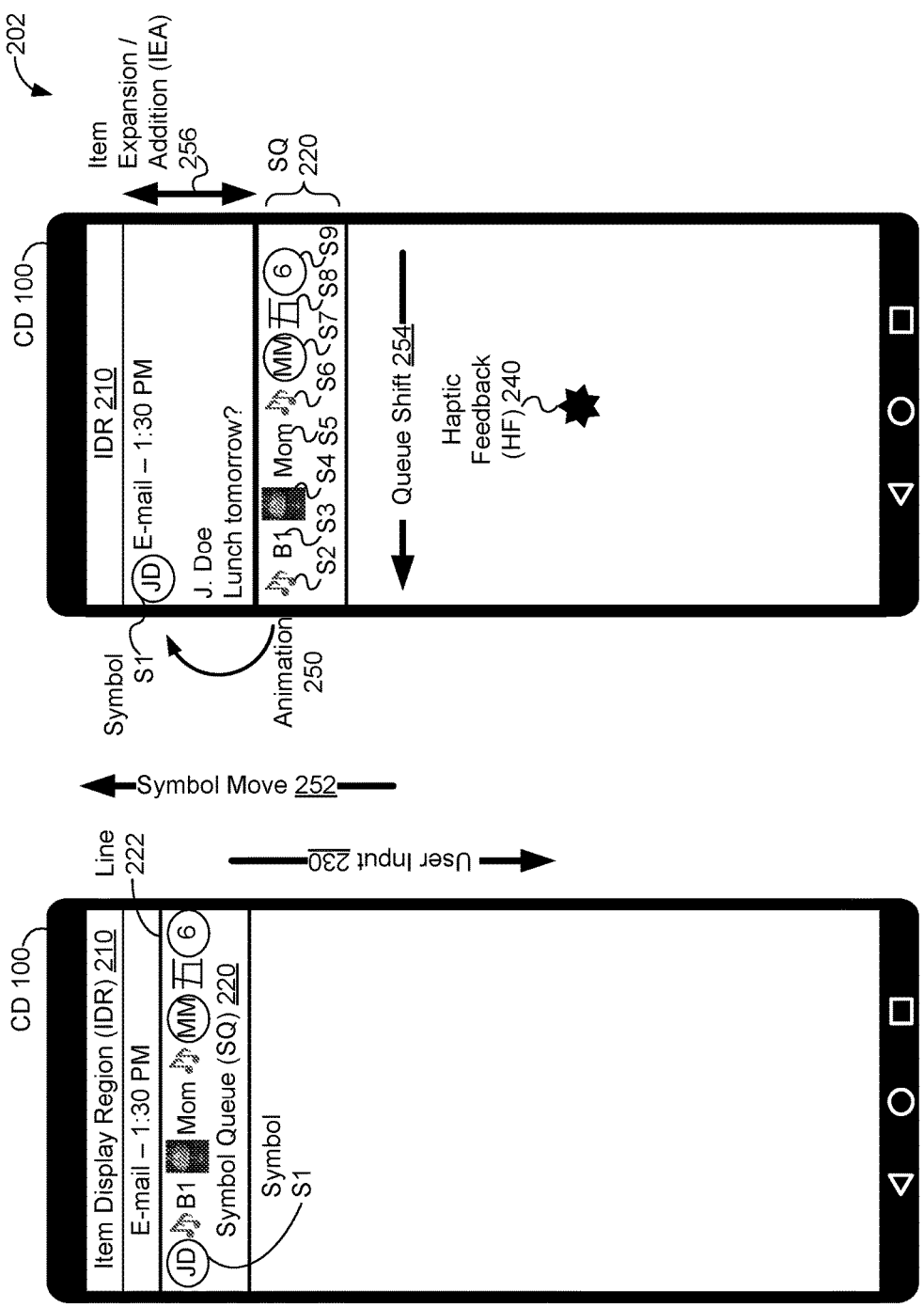
FIGS. 2, 3, and 4 show a scenario where a computing device provides animations and synchronized haptic feedback in response to user input, in accordance with an example embodiment.
Figure 3:
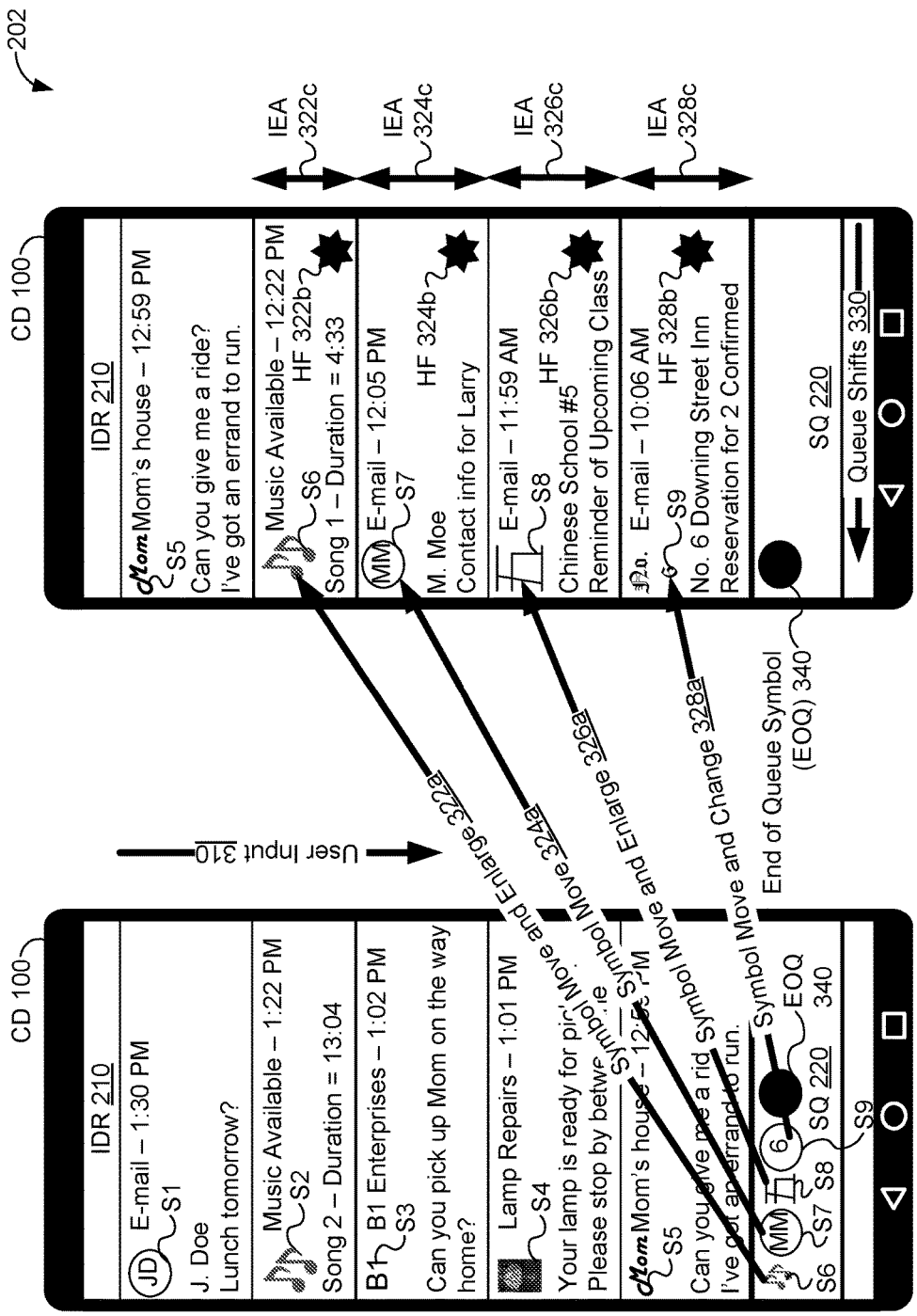
Figure 4:
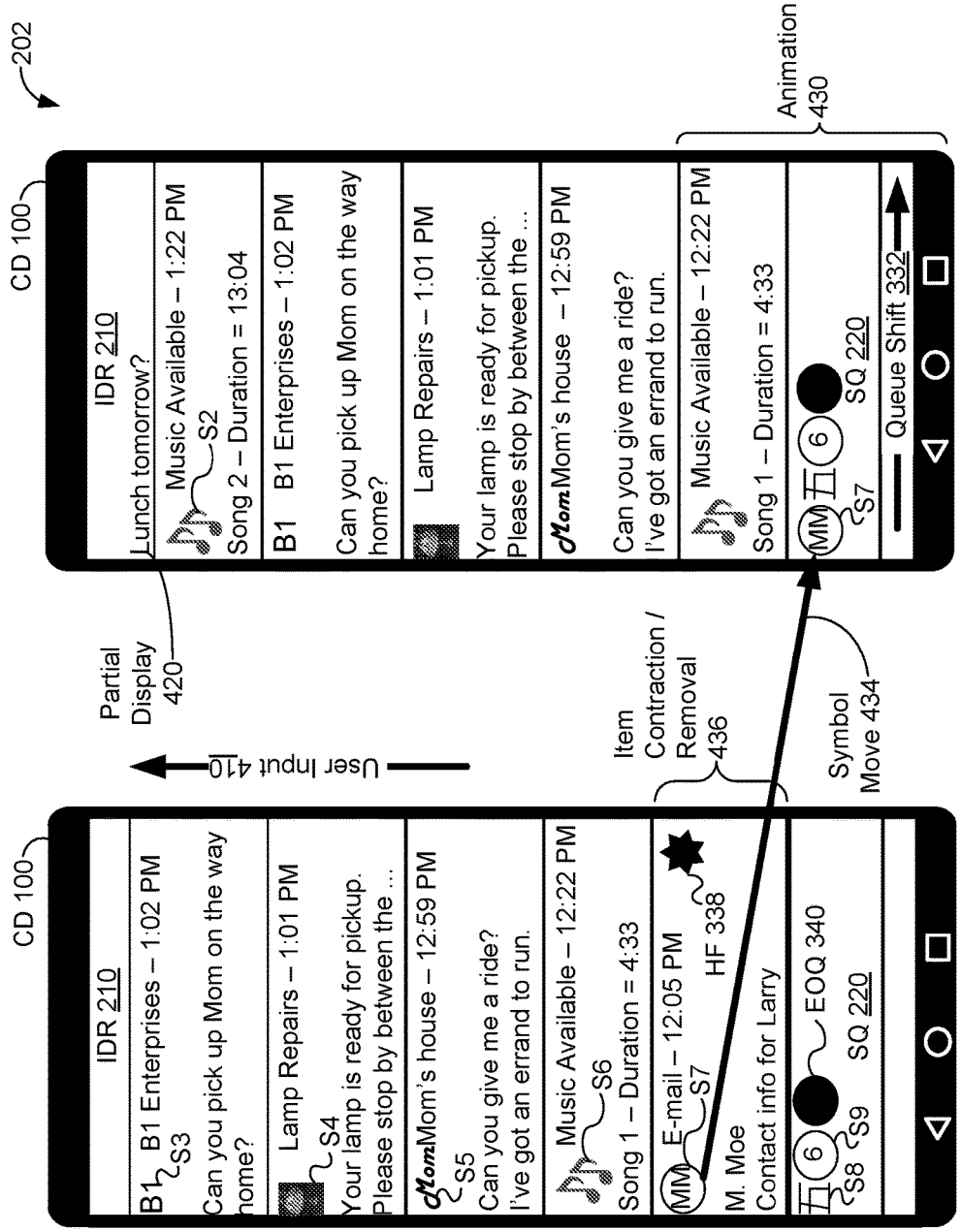

FIGS. 2, 3, and 4 show scenario 202 where computing device 100 provides discrete feedback events that include animations and synchronized haptic feedback in response to user input, in accordance with an example embodiment. During scenario 202, computing device 100 receives user inputs to scroll down, and then scroll up through a list of nine informational items displayed in item display region (IDR) 210 and nine symbols related to the nine informational items in the list displayed in symbol queue SQ) 220. Throughout scenario 202, symbol queue 220 is displayed adjacent to and below item display region 210. Also, computing device 100 displays item display region 210 as visually distinct from symbol queue 220; e.g., item display region 210 is visually divided from symbol queue 220 by line 222, and item display region 210 is displayed in a separate region of a screen of computing device 100 above symbol queue 220.

In scenario 202, the list of informational items is shown in order of recency; that is, the most recently-received informational item is shown at a top of the list, the second most recent item follows the top item of the list, and so on, until a bottom of the list shows the oldest (least recent) informational item. Other orderings of lists of information items are possible; e.g., sorted by reverse recency (that is, oldest items first rather than newest items first as shown in scenario 202), sorted by a type of informational items; e.g., e-mails first followed by text messages, etc., sorted by a name of a party related to an informational item; e.g., an author, sender, or receiver of the informational item; sorted by distance from a location; e.g., where informational items are related to a route or map, etc. Examples of informational items that can be displayed using computing device 100 include, but are not limited to, one or more informational items related to: receipt of one or more messages, sending one or more messages, availability of one or more software downloads, a reminder of an event, one or more particular locations, one or more particular persons and/or entities, and one or more particular computing devices.

At an onset of scenario 202, as shown at left of FIG. 2, computing device 100 provides a user interface that displays item display region 210 and symbol queue 220. Item display region 210 initially displays a portion of an informational item of the list of informational items related to an "E-mail" that arrived at computing device 100 at "1:30 PM". Symbol queue 220 initially displays nine symbols related to nine respective informational items. These nine symbols include, from left to right, in symbol queue 220: S1, a symbol that is an image of a circle surrounding the letters "JD"; S2, a symbol representing musical notes; S3, an alphanumeric symbol "B1"; S4, an image of a lamp; S5, an alphanumeric symbol "Mom"; S6, another symbol representing musical notes; S7, a symbol having an image of a circle surrounding the letters "MM"; S8, a symbol having a Chinese character; and S9, a symbol of an image of a circle surrounding the number "6".

As shown at center and right of FIG. 2, scenario 202 continues with user input 230 being provided to scroll down through the informational items represented by symbols in symbol queue 220. In response to user input 230 to scroll down, computing device 100 generates one or more displays to show continuous movement of the informational items in item display region 210 down toward the bottom of the list of informational items.

Also in response to user input 230, symbol S1 in symbol queue 220 is animated by animation 250. Animation 250 of symbol S1 can involve changing the displays of item display region 210 and symbol queue 220 so that: (a) symbol S1 appears to move via symbol move 252 from symbol queue 220 to be displayed in the previously-display portion of the informational item displayed in item display region 210, (b) symbol queue 220 appears to shift leftward via queue shift 254 and thereby remove symbol S1, and (c) the previously-display portion of the informational item expands within item display region 210 via item expansion/addition (IEA) 256.

Further, computing device 100 provides haptic feedback 240 in coordination with animation 250. Haptic feedback 240 can be synchronized with animation 250 by at least: continuously scrolling an amount of expanded items AEI in item display region 210; determining that the amount AEI exceeds a threshold amount THR_AEI; and in response to determining that the amount AEI exceeds the threshold amount THR_AEI, generating the haptic feedback. For example, the threshold amount THR_AEI can be a percentage of an expanded item, such as 5%, 10%, 25%, 33.333%, 50%, or some other percentage of the informational item expanded by item expansion/addition 256 in item display region 210. As another example, the threshold amount THR_AEI can be a number of vertical, horizontal, and/or total pixels of the informational item expanded by item expansion/addition 256 in item display region 210. More particularly, suppose that the informational item expanded by item expansion/addition 256 in item display region 210 is displayed in a rectangle R of pixels being V vertical pixels tall and H horizontal pixels wide, so that rectangle R has V*H total pixels. Then, THR_AEI can be expressed in terms of a number of vertical pixels, horizontal pixels, and/or total pixels; e.g., at least 5 vertical pixels of rectangle R are displayed, at least 300 horizontal pixels of rectangle R are displayed, at least 1001 total pixels or rectangle R are displayed, etc.

In some contexts, a number of vertical pixels can be considered to be a scrolling distance that the list of informational items has been scrolled; e.g., if 30 vertical pixels are added to the list of informational items by item expansion/addition 256, then the scrolling distance of item expansion/addition 256 can be 30 pixels, as a bottom of the list of informational items has moved/scrolled by 30 pixels. Then, THR_AEI can be expressed in terms of scrolling distances; e.g., the list of informational items has been scrolled at least 10, 20, 25, 33, etc. pixels of scrolling distance. Other values and/or combinations of the amounts AEI and THR_AEI can be determined to synchronize haptic feedback 240 with animation 250 are possible as well.

Scenario 202 continues, as shown at left of FIG. 3, with computing device 100 receiving additional user input 310 to scroll down through the informational items represented by symbols in symbol queue 220. In response to user input 310 to scroll down, computing device 100 generates one or more displays to show continuous movement of the informational items in item display region 210 down toward the bottom of the list of informational items At left of FIG. 3, item display region 210 displays five informational items—from top to bottom, the five informational items relate to: (1) an "E-mail" that arrived at computing device 100 at "1:30 PM" whose display includes a depiction of symbol S1 displayed at left of the informational item; i.e., the expanded informational item displayed in FIG. 2, (2) an indication of "Music Available" that arrived at computing device 100 at "1:22 PM" whose display includes a depiction of symbol S2, (3) a message from "B1 Enterprises" that arrived at computing device 100 at "1:02 PM" whose display includes a depiction of symbol S3, (4) a message from "Lamp Repairs" that arrived at computing device 100 at "1:01 PM" whose display includes a depiction of symbol S4, and (5) a message from "Mom's house" that arrived at computing device 100 at "12:59 PM" whose display includes a depiction of symbol S5.

Also at left of FIG. 3, symbol queue 220 includes five symbols—from left to right, these five symbols are symbols S6, S7, S8, and S9 mentioned above in the context of FIG. 2 and end of queue (EOQ) symbol 340 for symbol queue 220. End of queue symbol 340 can inform a user of computing device 100 that no additional symbols are left in symbol queue 220.

Scenario 202 continues after user input 310 has been received at computing device 100 with computing device animating symbols S6, S7, S8, and S9 of symbol queue 220 and related expanded informational items displayed in item display region 210. As mentioned above and as shown at left of FIG. 3, symbol S6 is a symbol representing musical notes, symbol S7 is a symbol having an image of a circle surrounding the letters "MM", symbol S8 is a symbol having a Chinese character, and symbol S9 is a symbol having an image of a circle surrounding the number "6".

As shown at right of FIG. 3, computing device 100 responds to user input 310 by animating symbols S6-S9. Computing device 100 animates symbol S6 by: performing symbol move and enlarge operation 322a to move symbol S6 out of symbol queue 220; enlarging display of symbol S6 as part of item expansion/addition 322c of an information item of a message about "Music Available" that arrived at computing device 100 at "12:22 PM"; performing a leftward queue shift of queue shifts 330; and providing haptic feedback 322b synchronized to occur during the animation of symbol S6.

Computing device 100 animates symbol S7 by: performing symbol move operation 324a to move symbol S7 out of symbol queue 220; displaying symbol S7 as part of item expansion/addition 324c of an information item of an "E-mail" from "M. Moe" that arrived at computing device 100 at "12:05 PM"; performing a leftward queue shift of queue shifts 330; and providing haptic feedback 324b synchronized to occur during the animation of symbol S7.

Computing device 100 animates symbol S8 by: performing symbol move and enlarge operation 326a to move symbol S8 out of symbol queue 220; enlarging display of symbol S8 as part of item expansion/addition 326c of an information item of an "E-mail" about a "Reminder of Upcoming Class" that arrived at computing device 100 at "11:59 AM"; performing a leftward queue shift of queue shifts 330; and providing haptic feedback 326b synchronized to occur during the animation of symbol S8.

Computing device 100 animates symbol S9 by: performing symbol move and change operation 328a to move symbol S9 out of symbol queue 220; changing display of symbol S9 from a symbol on a circle surrounding a number "6" to a symbol representing "No. 6" as part of item expansion/addition 328c of an information item of an "E-mail" about a "Reservation for 2 Confirmed" that arrived at computing device 100 at "10:06 AM"; performing a leftward queue shift of queue shifts 330; and providing haptic feedback 328b synchronized to occur during the animation of symbol S9. After all of queue shifts 330, only end of queue symbol 340 is shown in symbol queue 220 at lower left of FIG. 3.

Performing item expansions/additions 322c, 324c, 326c, 328c takes up space within item display region 210 for the expanded displays of the respective informational items associated with respective symbols S6, S7, S8, and S9. Also, the previously-displayed expanded display of the informational items associated with symbols S1, S2, S3, and S4 are removed and the previously-displayed expanded display of the informational item associated with symbol S5 is moved up in item display region 210 to be atop item expansions/additions 322c, 324c, 326c, 328c. The net effect of these operations is for computing device 100 to scroll down in (toward the bottom of) the list of informational items.

Scenario 202 continues after the animations of symbols S6, S7, S8, and S9 with computing device 100 receiving user input 410 to scroll up. Before receiving user input 410, computing device 100 provides expanded displays of the informational items associated with symbols S3, S4, S5, S6, and S7 in item display region 210 and provides displays of symbols S8, S9, and end of queue symbol 340 in symbol queue 220 as illustrated at left of FIG. 4.

In response to user input 410 to scroll up, computing device 100 generates one or more displays to show continuous movement of the informational items in item display region 210 up toward the top of the list of informational items. As part of this continuous movement, partial and/or complete displays of informational items can be added in item display region 210, such as partial display 420 shown at upper right of FIG. 4, and complete expanded display of the informational item associated with symbol S2.

After user input 410 has been received, computing device 100 performs animation 430 to animate symbol S7 by carrying out: queue shift 432 leftward to make a leftmost space for symbol S7; symbol move 434 to move symbol S7 from item display region 210 to the leftmost space of symbol queue 220 item contraction/removal 436 to remove the informational item associated with symbol S7 from item display region 210; and providing haptic feedback 438 synchronized to occur during the animation of symbol S7.

Performing item contraction/removal 436 makes space within item display region 210 for both partial display 420 and the expanded display of the informational item associated with symbol S2. Also, the previously-displayed expanded displays of the informational items associated with symbols S3, S4, S5, and S6 are moved down in item display region 210. The net effect of these operations is for computing device 100 to scroll up in (toward the top of) the list of informational items.

Figure 5:
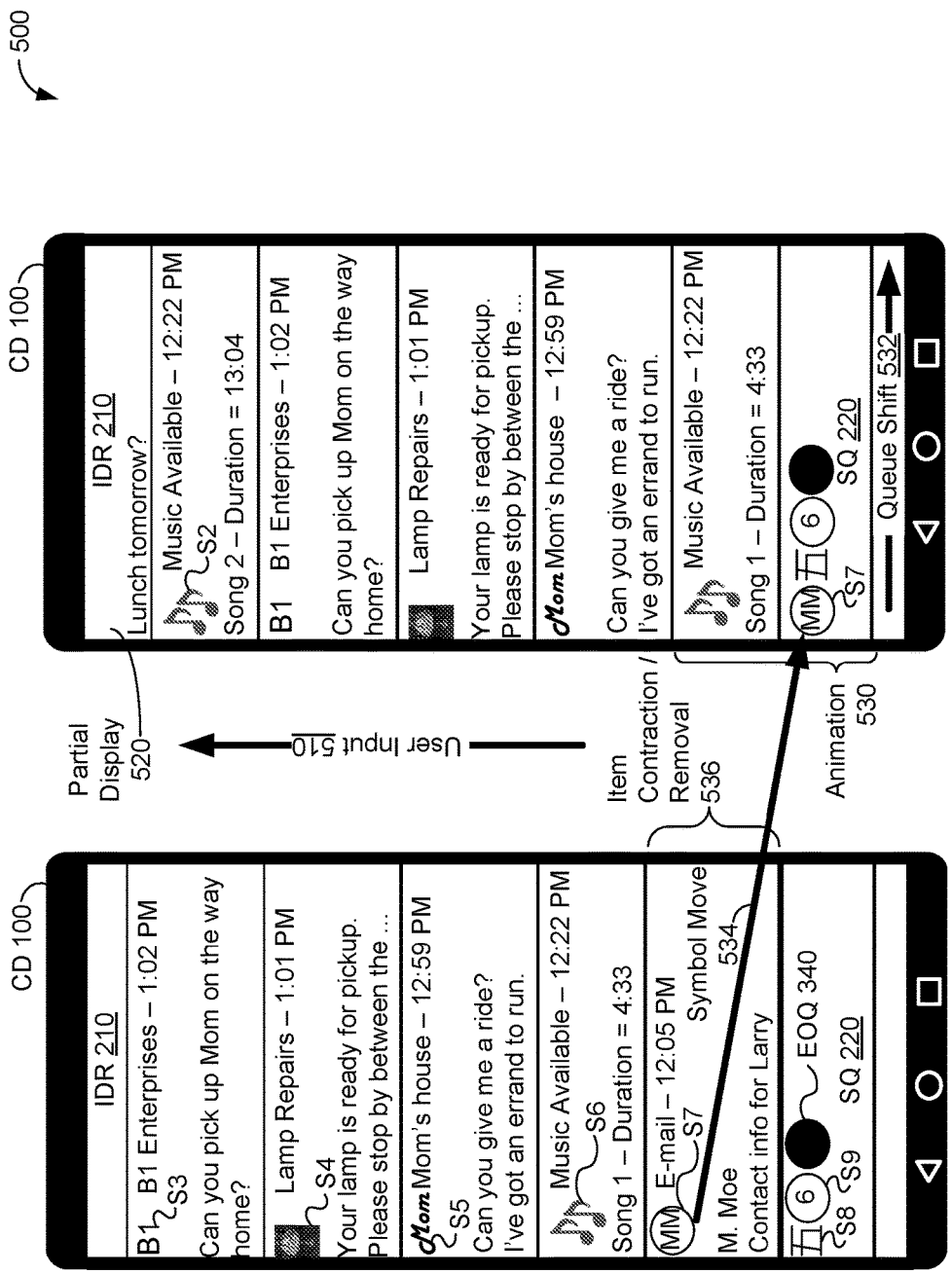
FIGS. 5 and 6 show a scenario where a computing device provides animations in response to user input, in accordance with an example embodiment.
Figure 6:
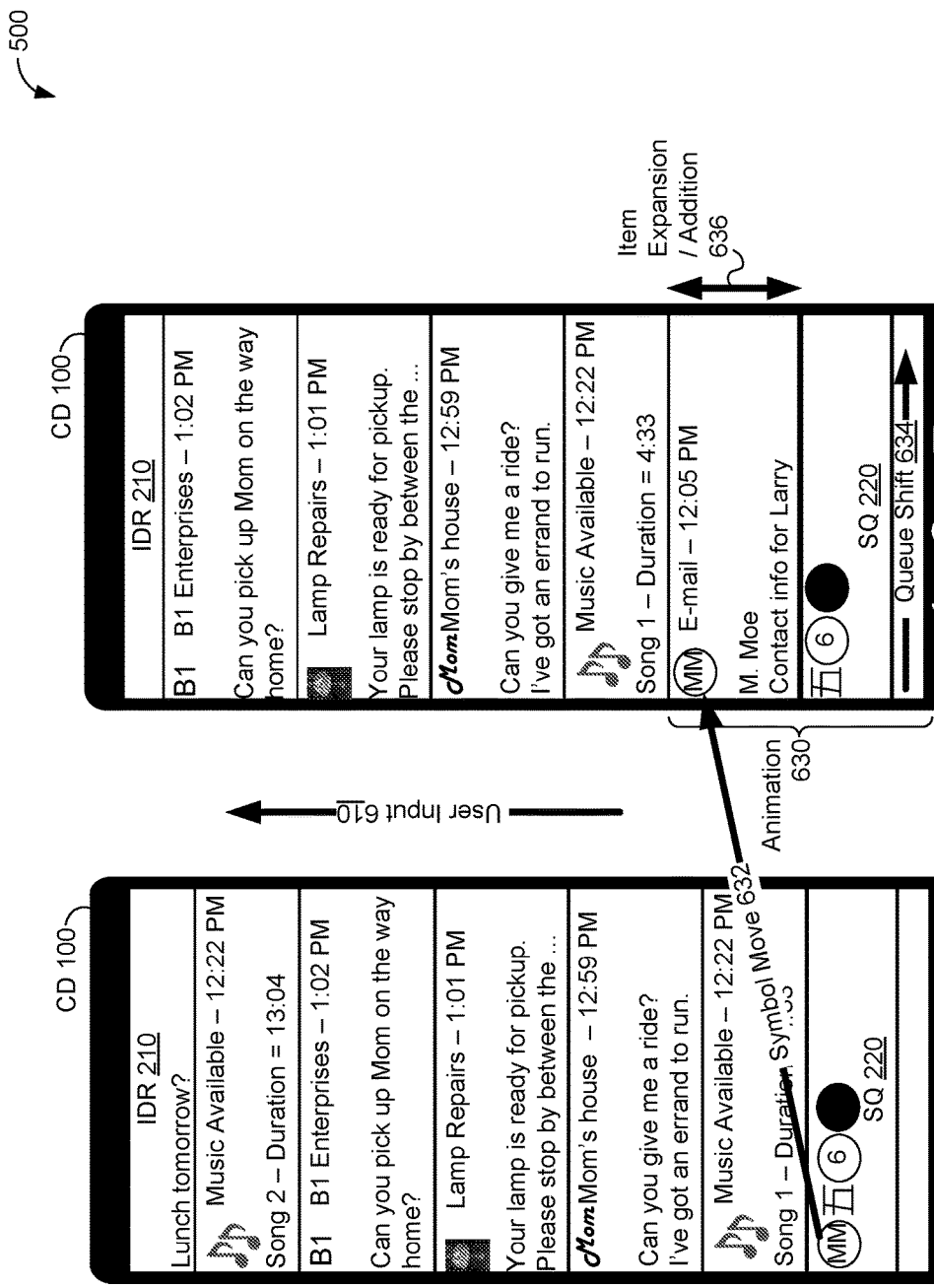

FIGS. 5 and 6 show scenario 500 where computing device 100 provides discrete feedback events that include animations in response to user input, in accordance with an example embodiment. Scenario 500 is similar to scenario 202, except that haptic feedback is not provided as part of the discrete feedback events of scenario 500. That is, in scenario 202, computing device 100 provides discrete feedback events that include both visual feedback (e.g., symbol animations) and haptic feedback, while in scenario 500, computing device 100 provides discrete feedback events that include visual feedback only.

FIG. 5 shows the same display as shown at left of FIG. 3; that is, computing device 100 provides expanded displays of the informational items associated with symbols S3, S4, S5, S6, and S7 in item display region 210 and provides displays of symbols S8, S9, and end of queue symbol 340 in symbol queue 120.

Scenario 500 continues with computing device 100 receiving user input 510 to scroll up. In response to user input 510 to scroll up, computing device 100 generates one or more displays to show continuous movement of the informational items in item display region 210 up toward the top of the list of informational items, such as discussed above in the context of at least FIG. 3.

After user input 510 has been received, computing device 100 performs animation 530 to animate symbol S7 by carrying out: queue shift 532 leftward to make a leftmost space for symbol S7; symbol move 534 to move symbol S7 from item display region 210 to the leftmost space of symbol queue 120, and item contraction/removal 536 to remove the informational item associated with symbol S7 from item display region 210. In contrast with scenario 202, no haptic feedback is provided with animation 530.

Performing item contraction/removal 536 makes space within item display region 210 for both partial display 520 and the expanded display of the informational item associated with symbol S2. Also, the previously-displayed expanded displays of the informational items associated with symbols S3, S4, S5, and S6 are moved down in item display region 210. The net effect of these operations is for computing device 100 to scroll up in (toward the top of) the list of informational items.

Scenario 500 continues with computing device 100 receiving user input 610 to scroll down. In response to user input 610 to scroll down, computing device 100 generates one or more displays to show continuous movement of the informational items in item display region 210 down toward the bottom of the list of informational items. A left side of FIG. 6 shows computing device 100 before receiving user input 610 providing the same display as shown at right of FIG. 5.

After receiving user input 610, computing device 100 performs animation 630 of symbol S7. Computing device 100 animates symbol S7 by: performing symbol move operation 632 to move symbol S7 out of symbol queue 120; displaying symbol S7 as part of item expansion/addition 636 of an information item related to an "E-mail" from "M. Moe" that arrived at computing device 100 at "12:05 PM" and performing a leftward queue shift 634. In contrast with scenario 202, no haptic feedback is provided with animation 630.

Performing item expansion/addition 636 takes up space within item display region 210 for the expanded displays of the respective informational items associated with symbol S7. Also, the previously-displayed expanded display of the informational item associated with symbol S2 is removed and previously-displayed expanded displays of the informational items associated with symbols S3, S4, S5, and S6 are moved up in item display region 210 to be atop item expansion/addition 636. The net effect of these operations is for computing device 100 to scroll down in (toward the bottom of) the list of informational items.

In some examples, audible feedback can be provided along with the animations and/or haptic feedback of scenarios 202 and/or 500. In these examples, in scenario 202, a discrete feedback event associated with animation of a symbol involves visual, audible, and haptic feedback, while in scenario 500, a discrete feedback event associated with animation of a symbol involves visual and audible feedback. Such audible feedback can include one or more tones or other sounds provided by computing device 100. In particular examples, such audible feedback can be synchronized to occur approximately or exactly at the same time haptic feedback is provided. In other particular examples, audible feedback occurs at a different time than when haptic feedback is provided; e.g., audible feedback is provided at a beginning of an animation of a symbol and haptic feedback is provided at an end of the animation or vice versa.

In scenarios 202 and 500, the informational items displayed by computing device 100 in item display region 210 and related symbols displayed in symbol queue 120 relate mainly to communications received at computing device 100; e.g., e-mails, text messages, notifications of available music, etc. In other examples, the informational items displayed by computing device 100 in item display region 210 and related symbols displayed in symbol queue 120 can relate to other types of informational items.

For example, item display region 210 can display informational items related to navigational instructions for traveling between a point A and a point B. Then, related symbols displayed in symbol queue 120 can indicate various waypoints indicated by the navigational instructions. In particular, suppose the navigational instructions for traveling between point A and point B involve: (1) taking Highway HWY111 north from point A to an intersection I1 of Highways HWY111 and HWY222,(2) taking Highway HWY222 east from intersection I1 to an intersection I2 of Highway HWY222 and road RD333, (3) traveling north along road RD333 from intersection I2 to an intersection I3 between an end of road RD333 and street ST444, and (4) traveling west on street ST444 to point B. Each of navigational instructions (1), (2), (3), and (4) listed above can be represented by an informational item, and each navigational instruction/informational item can be associated with a symbol related to the navigational instruction/informational item. Examples of the related symbols can be a symbol for intersection "I1" associated with navigational instruction/informational item (1), as navigational instruction (1) ends when intersection I1 is reached. Similarly, navigational instructions/informational items (2), (3), and (4) can be associated with respective symbols for "I2", "I3", and "B".

In these examples, scrolling through a list of these navigational instructions/informational items can be controlled by user inputs as indicated in scenarios 202 and 500 and/or controlled based on a location of computing device 100. That is, as computing device travels along a route from point A to point B indicated by navigational instructions (1), (2), (3), and (4), a list of navigational instructions/informational items (1), (2), (3), and (4) can be scrolled as the computing device moves; e.g., navigational instruction/informational item (1) can be displayed until a location of computing device 100 is near or at intersection I1, navigational instruction/informational item (2) can be displayed while the location of computing device 100 is between intersection I1 and locations near or at intersection I2, and so on. As such, haptic feedback can be provided at a beginning of an animation triggered when the location of computing device 100 is near to a location where the route changes; e.g., when computing device 100 is within a predetermined distance of intersection I1; e.g. one foot, 10 meters, 0.1 km, 0.1 mile, 0.25 km, 0.25 mile, etc., an animation moving a symbol for intersection I1 from symbol queue 120 to item display region 210 and generating an item expansion/addition for navigational instruction/informational item (2). Thus, the animation and haptic feedback (and perhaps audible feedback) can provide multiple, reinforcing indications to a user of computing device 100 that computing device 100 is near a change in the route represented by navigational instructions/informational items (1), (2), (3), and (4), and therefore, the user may soon have to change the route.

Figure 7:
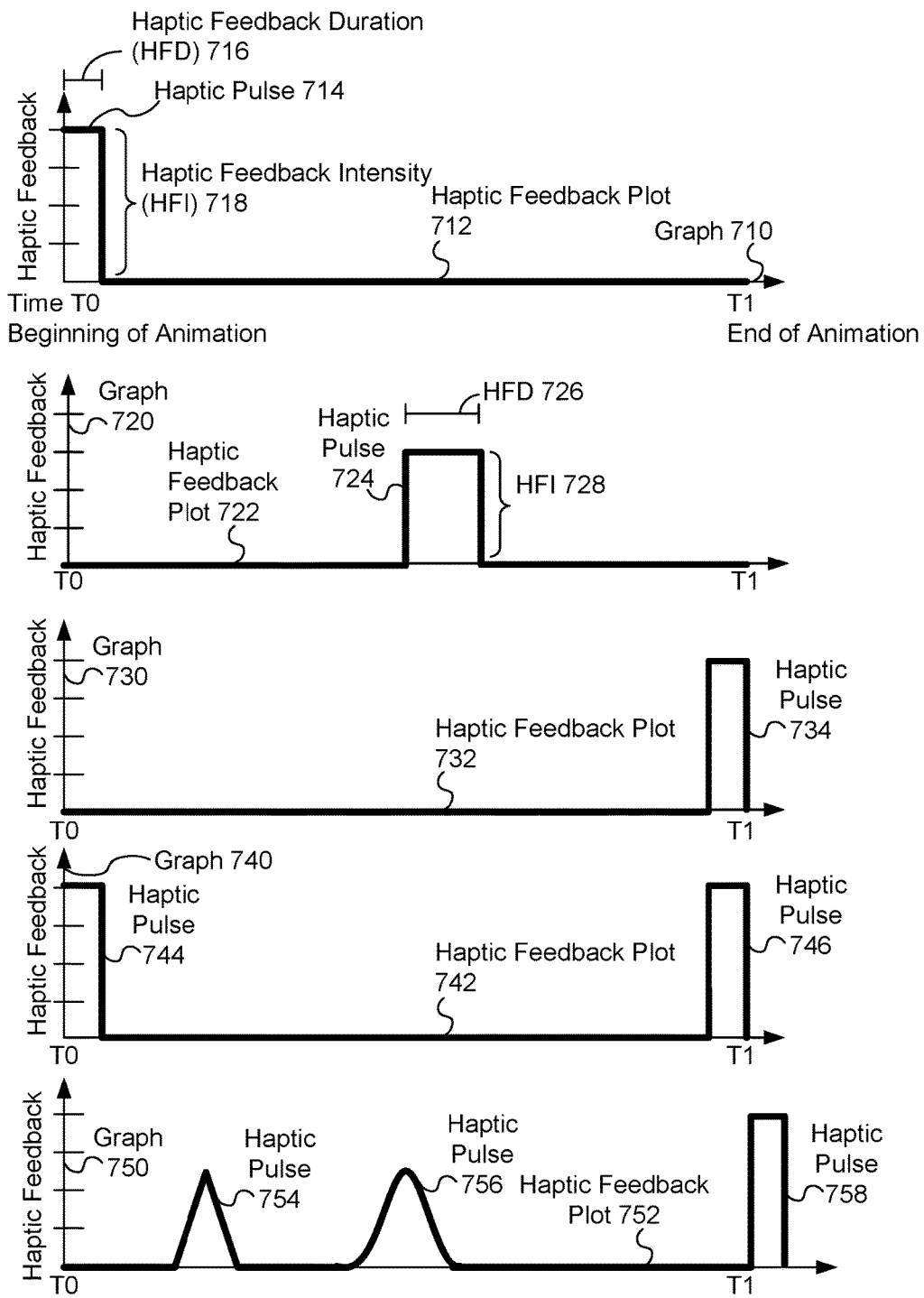
FIG. 7 depicts haptic feedback plots graphically representing haptic pulses for haptic feedback, in accordance with an example embodiment.

FIG. 7 depicts haptic feedback plots 712, 722, 732, 742, 752 graphically representing haptic pulses for providing haptic feedback as part of one or more discrete feedback events using a computing device, such as computing device 100, in accordance with an example embodiment. As shown in FIG. 7, haptic feedback plots 712, 722, 732, 742, 752 are shown on respective graphs 710, 720, 730, 740, 750. Each of graphs 710, 720, 730, 740, 750 represents time on an X (horizontal) axis and haptic feedback on a Y (vertical) axis. Each of graphs 710, 720, 730, 740, 750 represents a time interval that starts at time T0 which is a time where an animation of a symbol begins, and ends on or about a time T1, which is a time where the animation of the symbol ends. Animations of symbols are discussed in more detail at least in the context of FIGS. 1-5.

If haptic feedback is shown at a zero level at a given time GT in one of plots 712, 722, 732, 742, 752, then no haptic feedback is to be provided by the computing device at time GT. Otherwise, haptic feedback is shown having a positive non-zero level at a given time GT in one of plots 712, 722, 732, 742, 752, then haptic feedback is to be provided by the computing device, where the provided haptic feedback is to have the intensity indicated by the plot at time GT.

Graph 710 includes haptic feedback plot 712 where haptic pulse 714 of relatively-short haptic feedback duration (HFI) 716 of relatively-high haptic feedback intensity (HFD) 718 (i.e., relatively-high haptic frequency and/or relatively-high haptic power) is generated starting at time T0; i.e., haptic feedback is provided at a beginning of an animation of a symbol. Haptic frequency can be specified as a value in Hertz (or perhaps another unit related to frequency) indicating how often vibrations of haptic feedback occur. For example, a haptic frequency value between 10-800 Hertz can be utilized to provide 10 to 800 vibrations per second and perhaps generate a feeling of touch (at lower frequencies) and/or vibration. Haptic power can be a value of an amount of power for generating haptic feedback; e.g, a value specifying how much power is provided to an actuator providing haptic feedback. Haptic intensity can then be determined as one or more linear and/or non-linear combinations of the haptic frequency and haptic power values. After haptic pulse 714 is generated, haptic feedback plot 712 indicates no more haptic feedback is to be provided during the animation of the symbol.

Graph 720 includes haptic feedback plot 722 where haptic pulse 724 of relatively-long haptic feedback duration 726 of relatively-high haptic feedback intensity 728 is generated starting at a time about halfway between times T0 and T1; i.e., haptic feedback is provided about halfway through an animation of a symbol. After haptic pulse 724 is generated, haptic feedback plot 722 indicates no more haptic feedback is to be provided during the animation of the symbol.

Graph 730 includes haptic feedback plot 732 where haptic pulse 734 of relatively-short haptic feedback duration of relatively-high haptic feedback intensity is generated just before time T1; i.e., haptic feedback is provided at near an end of an animation of a symbol. Haptic feedback plot 732 indicates only haptic pulse 734 is to be provided during the animation of the symbol.

Graph 740 includes haptic feedback plot 742 where haptic pulse 744 of relatively-short haptic feedback duration of relatively-high haptic feedback intensity is generated starting at time T0 and haptic pulse 746 of relatively-short haptic feedback duration of relatively-high haptic feedback intensity is generated just before time T1; i.e., haptic feedback is provided at the beginning and the end of an animation of a symbol. That is, haptic feedback plot 742 is a combination of haptic feedback plots 712 and 732, indicating that multiple haptic pulses can be provided during one animation of a symbol.

Graph 750 includes haptic feedback plot 752 where haptic pulse 754 of relatively-moderate haptic feedback duration of relatively-low haptic feedback intensity is generated starting at a time about one-fourth of the time between times T0 and T1, haptic pulse 756 of relatively-moderate haptic feedback duration of relatively-low haptic feedback intensity is generated starting at a time about halfway between times T0 and T1, and haptic pulse 756 of relatively-short haptic feedback duration of relatively-high haptic feedback intensity is generated starting at time T1; i.e., haptic feedback is provided at three times during an animation of a symbol.

Haptic pulse 754 is shown in FIG. 7 having a triangular wave shape; that is an intensity of haptic pulse 754 increases linearly to a maximum intensity for the pulse and then decreases linearly to a zero intensity to end haptic pulse 754. Haptic pulse 756 is shown in FIG. 7 having an approximately sinusoidal shape; that is, an intensity of haptic pulse 756 increases from zero to a maximum intensity for the pulse and then decreases to a zero intensity to end haptic pulse 756 approximately according to a partial sine wave. Haptic pulse 758 is shown in FIG. 7 as having a square wave shape (as well as haptic pulses 714, 724, 734, 744, and 746); that is an intensity of increases from zero to a maximum intensity for haptic pulse 756 immediately at a beginning of haptic pulse 756 and decreases from the maximum intensity back to zero immediately at an end of haptic pulse 756. Other shapes and/or waveforms of haptic pulses; e.g., random shapes, exactly sinusoidal and/or other trigonometrically-oriented shapes, shapes involving exponential curves, other linear shapes, other non-linear shapes, combinations of shapes etc. are possible as well. As such, graph 750 illustrates that haptic feedback can vary in duration, intensity, and waveform during an interval of time between times T0 and T1.

In some examples, some or all of haptic pulses 714, 724, 734, 744, 746, 754, 756, and 758 can have different durations and/or intensities than shown in FIG. 7. In other examples, one or more of haptic feedback plots 712, 722, 732, 742, 752 and/or other haptic feedback plots can indicate values of haptic frequency and/or haptic power to be provided as part of haptic feedback; that is, rather than using haptic intensity values as shown in FIG. 7, separate values of haptic feedback and haptic power can be plotted. As such, these haptic feedback plots can be plotted on three axes—one axis for haptic power; e.g., an X axis, one axis for time during an animation, e.g., a Y axis such as shown in graphs 710-750, and one axis for haptic frequency; e.g., a Z axis.

In still other examples, audible feedback is provided as part of one or more discrete feedback events, as discussed above. In these examples, audible feedback can be generated using plots 712, 722, 732, 742, 752 and/or other plots; e.g., if audible feedback is generated according to plot 712, then a short duration of relatively high intensity (i.e., high-volume and/or high-frequency) sound is generated at time T0 when an animation of a symbol begins. As another example, audible feedback can be plotted using three axes—separate axes for audible power (i.e., volume), time, and audible frequency—as analogously indicated above for haptic feedback.

Figure 8:
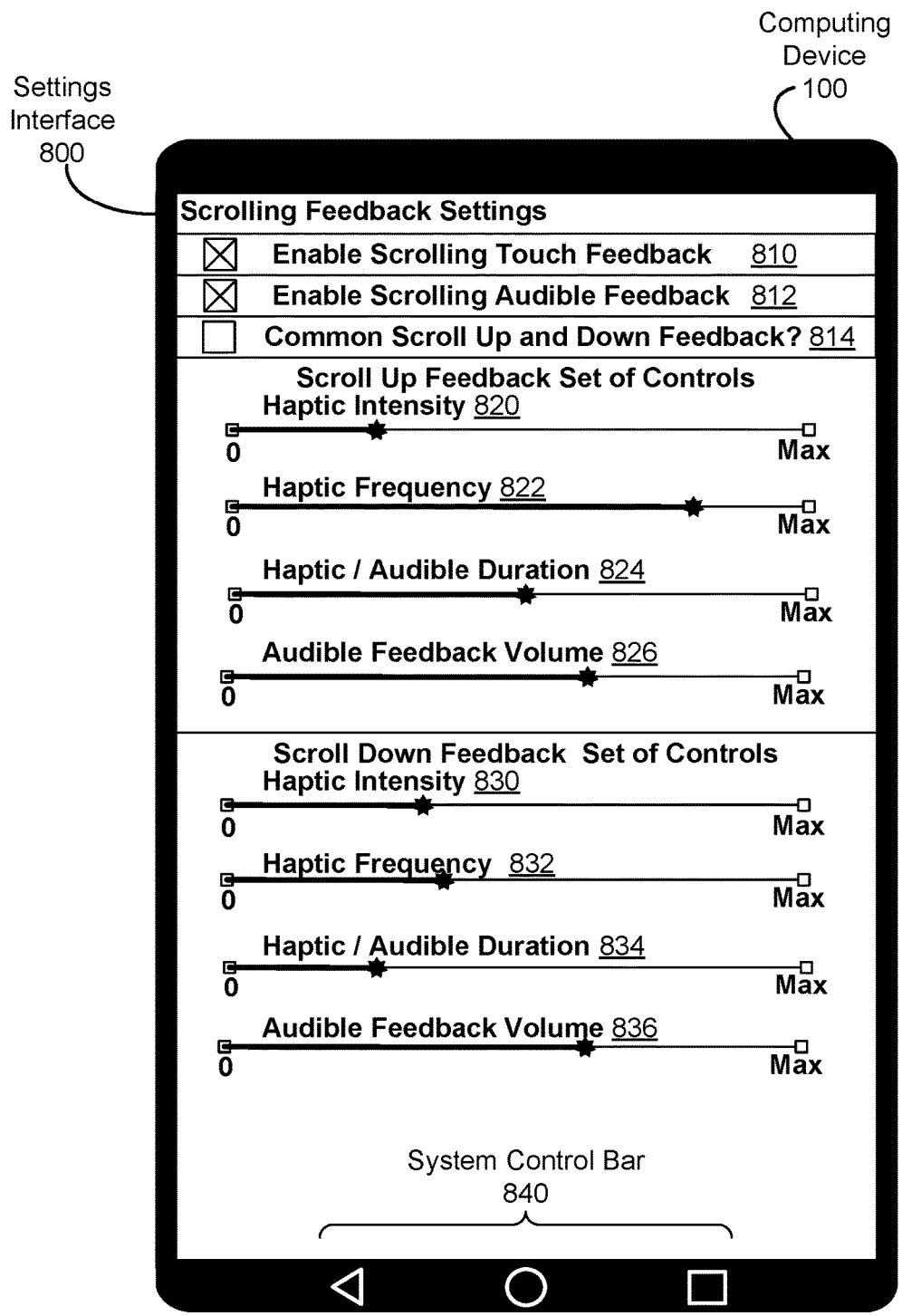
FIG. 8 shows a settings interface for haptic feedback, in accordance with an example embodiment.

FIG. 8 shows settings interface 800 for haptic feedback of computing device 100, in accordance with an example embodiment. Settings interface 800 provides various controls to adjust haptic and audible feedback including enable scrolling touch (haptic) feedback control 810, enable scrolling audible feedback control 812, common scroll up and down feedback control 814, scroll up feedback controls 820, 822, 824, 826, scroll down feedback controls 830, 832, 834, 836, and system control bar 840. Some or all of the controls of settings interface 800 can be modified based on user input; e.g., touch, mouse, and/or keyboard input to toggle selection or non-selection of a selection box or to adjust a slider control.

Scrolling touch (haptic) feedback control 810, when selected as shown in FIG. 8 by an "X" in a selection box of control 810, enables haptic feedback during animations of symbols, such as discussed at least in the context of FIGS. 1-7. When enable touch feedback control 810 is not selected, haptic feedback during animations of symbols is disabled.

Enable scrolling audible feedback control 812, when selected as shown in FIG. 8 by an "X" in a selection box of control 812, enables audible feedback during animations of symbols, such as discussed at least in the context of FIGS. 1-6. When enable audible feedback control 812 is not selected, audible feedback during animations of symbols is disabled.

Common scroll up and down feedback control 814, when selected, enables common up and down feedback during animations of symbols associated while scrolling through a list of informational items. That is, common scroll up and down feedback involves that haptic and/or audible feedback applied to animations of symbols when scrolling up through the list of informational items is "common" with/the same as haptic and/or audible feedback applied to animations of symbols when scrolling down through the list of informational items. When common scroll up and down feedback control 814 is not selected, as shown in FIG. 8 by an empty selection box of control 814, different haptic and/or audible feedback can occur during animations of symbols while scrolling up through the list of informational items than can occur during animations of symbols while scrolling down through the list of informational items.

Scroll up feedback set of controls 820, 822, 824, 826 enable selections of features for feedback generated during animations of symbols associated while scrolling up through a list of informational items. As shown in FIG. 8, the scroll up feedback set of controls include haptic intensity control 820, haptic frequency control 822, haptic/audible duration control 824, and audible feedback volume control 826.

Haptic intensity control 820 can be, as shown in FIG. 8, a slider control to enable selection of a value for haptic intensity for haptic feedback provided for animations of symbols displayed while scrolling up through the list of informational items. Haptic intensity is discussed above in more detail in the context of FIG. 7. The slider control for haptic intensity control 820 enables selection of a value for haptic intensity between zero (or, in other examples, a non-zero minimum value) and a maximum value. If the zero value is selected, no haptic intensity, and therefore no haptic feedback, is applied for animations of symbols displayed while scrolling up through the list of informational items.

Haptic frequency control 822 can be, as shown in FIG. 8, a slider control to enable selection of a value for haptic frequency for haptic feedback provided for animations of symbols displayed while scrolling up through the list of informational items. Haptic frequency is discussed above in more detail in the context of FIG. 7. The slider control for haptic frequency control 822 enables selection of a value for haptic frequency between zero (or, in other examples, a non-zero minimum value) and a maximum value. If the zero value is selected, no haptic frequency, and therefore no haptic feedback, is applied for animations of symbols displayed while scrolling up through the list of informational items.

Haptic/audible duration control 824 can be, as shown in FIG. 8, a slider control to enable selection of a duration value for haptic and/or audible feedback provided for animations of symbols displayed while scrolling up through the list of informational items. The slider control for haptic/audible duration control 824 enables selection of a time value between zero (or, in other examples, a non-zero minimum value) and a maximum value. If the zero time value is selected, haptic and/or audible feedback has no duration, and therefore no haptic and/or audible feedback is applied for animations of symbols displayed while scrolling up through the list of informational items.

Audible feedback volume control 826 can be, as shown in FIG. 8, a slider control to enable selection of volume value audible feedback provided for animations of symbols displayed while scrolling up through the list of informational items. The slider control for audible feedback volume control 826 enables selection of audible volume between zero (or, in other examples, a non-zero minimum value) and a maximum value. If the zero audible volume value is selected, audible feedback has no volume, and therefore no audible feedback is applied for animations of symbols displayed while scrolling up through the list of informational items.

In examples where enable touch feedback control 810 is not selected, related controls, such as haptic intensity control

820 and/or haptic frequency control 822, can be disabled; i.e., greyed out and/or non-responsive to user input. In examples where enable audible feedback control 812 is not selected, related controls, such as audible feedback volume control 826, can be disabled.

Scroll down feedback controls 830, 832, 834, 836 enable selections of features for feedback generated during animations of symbols associated while scrolling down through a list of informational items. As shown in FIG. 8, the scroll down feedback set of controls include haptic intensity control 830, haptic frequency control 832, haptic/audible duration control 834, and audible feedback volume control 836.

The scroll down feedback set of controls can correspond to the previously-discussed scroll up feedback set of controls. That is, haptic intensity control 820, haptic frequency control 822, haptic/audible duration control 824, and audible feedback volume control 826 for haptic and/or audible feedback generated while scrolling up in the list of informational items can respectively correspond to haptic intensity control 830, haptic frequency control 832, haptic/audible duration control 834, and audible feedback volume control 836 for haptic feedback generated while scrolling down in the list of informational items.

Haptic intensity control 830 can be, as shown in FIG. 8, a slider control to enable selection of a value for haptic intensity for haptic feedback provided for animations of symbols displayed while scrolling down through the list of informational items. Haptic intensity is discussed above in more detail in the context of FIG. 7. The slider control for haptic intensity control 830 enables selection of a value for haptic intensity between zero (or, in other examples, a non-zero minimum value) and a maximum value. If the zero value is selected, no haptic intensity, and therefore no haptic feedback, is applied for animations of symbols displayed while scrolling down through the list of informational items.

Haptic frequency control 832 can be, as shown in FIG. 8, a slider control to enable selection of a value for haptic frequency for haptic feedback provided for animations of symbols displayed while scrolling down through the list of informational items. Haptic frequency is discussed above in more detail in the context of FIG. 7. The slider control for haptic frequency control 832 enables selection of a value for haptic frequency between zero (or, in other examples, a non-zero minimum value) and a maximum value If the zero value is selected, no haptic frequency, and therefore no haptic feedback, is applied for animations of symbols displayed while scrolling down through the list of informational items.

Haptic/audible duration control 834 can be, as shown in FIG. 8, a slider control to enable selection of a duration value for haptic and/or audible feedback provided for animations of symbols displayed while scrolling down through the list of informational items. The slider control for haptic/audible duration control 834 enables selection of a time value between zero (or, in other examples, a non-zero minimum value) and a maximum value. If the zero time value is selected, haptic and/or audible feedback has no duration, and therefore no haptic and/or audible feedback is applied for animations of symbols displayed while scrolling down through the list of informational items.

Audible feedback volume control 836 can be, as shown in FIG. 8, a slider control to enable selection of volume value audible feedback provided for animations of symbols displayed while scrolling down through the list of informational items. The slider control for audible feedback volume control 836 enables selection of audible volume between zero (or, in other examples, a non-zero minimum value) and a maximum value. If the zero audible volume value is selected, audible feedback has no volume, and therefore no audible feedback is applied for animations of symbols displayed while scrolling down through the list of informational items.

In examples where enable touch feedback control 810 is not selected, related controls, such as haptic intensity control 830 and/or haptic frequency control 832, can be disabled; i.e., greyed out and/or non-responsive to user input. In examples where enable audible feedback control 812 is not selected, related controls, such as audible feedback volume control 836, can be disabled.

In examples where scroll up and down feedback control 814 is selected, either set of scroll up feedback controls 820, 822, 824, 826 or set of scroll down feedback controls 830, 832, 834, 836 can be used as a set of controls for common scroll up and down feedback and the non-used set of controls can be disabled. In some of these examples, the set of feedback controls used for common feedback can be labeled as a common set of controls; e.g., if scroll up and down feedback control 814 is selected and set of scroll up feedback controls 820, 822, 824, 826 used as a common set of controls, settings interface 800 can display "Common Feedback Set of Controls" above haptic intensity control 820, instead of "Scroll Up Feedback Set of Controls".

In other examples, where scroll up and down feedback control 814 is selected, both set of scroll up feedback controls 820, 822, 824, 826 and set of scroll down feedback controls 830, 832, 834, 836 can be "yoked together"; that is, the values of scroll up feedback controls 820, 822, 824, 826 are initially set to values of corresponding scroll down feedback controls 830, 832, 834, 836 (or vice versa); e.g., if haptic intensity control 820 for scrolling up is set to 50% intensity and scroll up and down feedback control 814 is selected, then haptic intensity control 830 for scrolling down is also set to 50% intensity. Then, if a value of one control in one set of feedback controls leads to the same adjustment being made to a corresponding control of the other set of feedback controls. For example, if scroll up and down feedback control 814 is selected and the slider control for haptic frequency 822 (for scrolling up) is moved up by an amount AMT, corresponding slider control for haptic frequency 822 (for scrolling down) is also moved up by the amount AMT or vice versa. As such, yoked together sets of feedback controls have the same values and therefore provide common scroll up and down feedback.

Other controls in the scroll up feedback and/or scroll down feedback sets of controls and/or other user-interface techniques for providing scroll up feedback and/or scroll down feedback sets of controls (e.g., selection boxes, radio buttons, numerical selection controls for entering/providing numerical values, etc.) are possible as well.

System control bar 840 provides controls related to settings interface 800 and other features of computing device 100. System control bar 840 includes, from left to right at a bottom of FIG. 8, a triangular-shaped control, a circular-shaped control, and a square-shaped control. The triangular-shaped control, when selected, can exit settings interface 800 and returns to a previously-displayed screen of the user interface of computing device 100. The circular-shaped control, when selected, can exit settings interface 800 and returns to a home screen of the user interface of computing device 100 where one or more applications, settings, and/or other information are available. The circular-shaped control, when selected, exits settings interface 800 and returns to a home screen of the user interface of computing device 100 where one or more applications, settings, and/or other information are available. In some examples, the previously-displayed screen of the user interface of computing device 100 is the home screen of the user interface of computing device 100. In other examples, control selections made using settings interface 800 are saved without further user input when settings interface 800 is exited. In other embodiments, before settings interface 800 is exited, further user input is requested to determine whether or not to save control selections made using settings interface 800.

The square-shaped control, when selected, can continue executing settings interface 800 and generate a display of recent information about one or more other applications, settings interfaces, and/or other displays currently available via the user interface of computing device 100. If settings interface 800 is selected from the display of recent information, then computing device 100 continues executing settings interface 800. If settings interface 800 is not selected from the display of recent information, then computing device 100 can execute software associated with applications, settings interfaces, and/or other displays and can suspend or exit from settings interface 800, perhaps after saving control selections made using settings interface 800.

In other examples, settings interface 800 can include one or more controls for: enabling/disabling animations of symbols as part of discrete feedback events, a duration of an animation, a number, timing, durations, intensity/intensities, and/or shapes of haptic and/or audible pulses provided as haptic and/or audible feedback as part of discrete feedback events, as well as other controls.

Example Data Network

Figure 9:
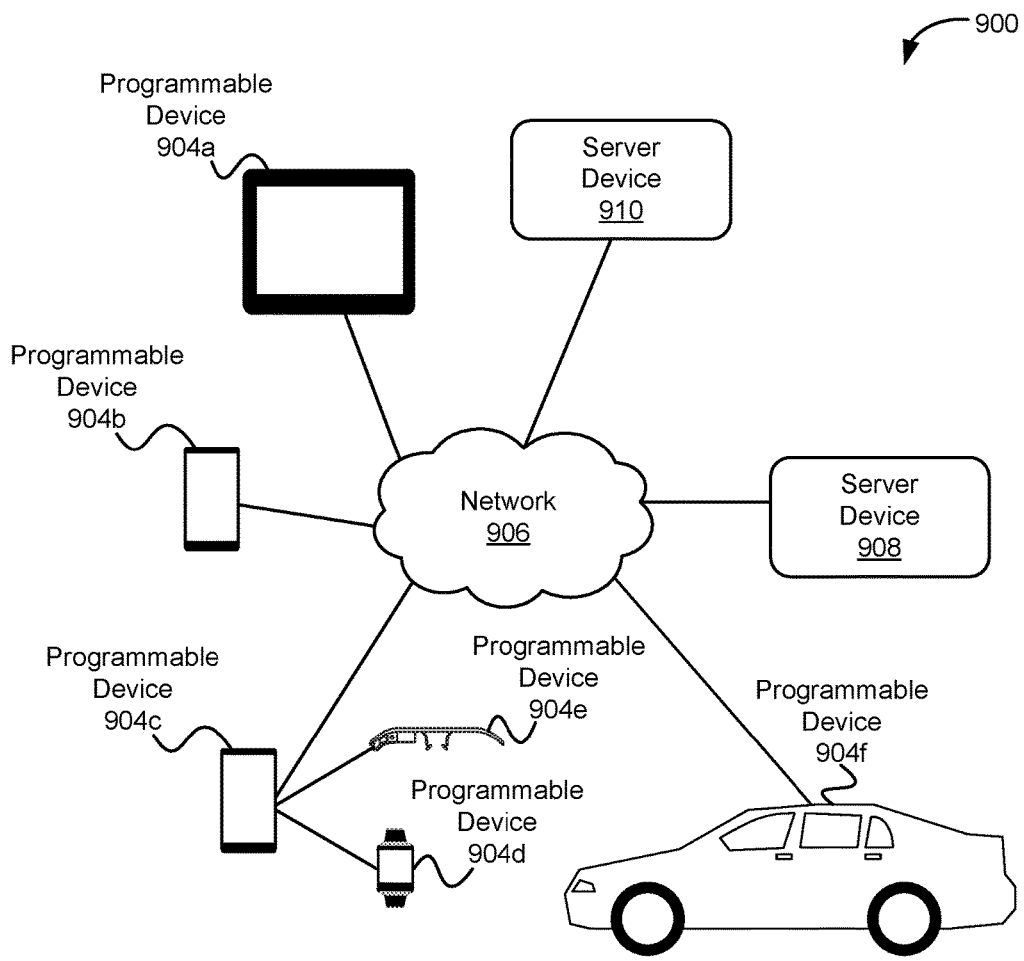
FIG. 9 depicts a distributed computing architecture, in accordance with an example embodiment.

FIG. 9 depicts a distributed computing architecture 900 with server devices 908, 910 configured to communicate, via network 906, with programmable devices 904a, 904b, 904c, 904d, 904e, 904f in accordance with an example embodiment. Network 906 may correspond to a LAN, a wide area network (WAN), a corporate intranet, the public Internet, or any other type of network configured to provide a communications path between networked computing devices. Network 906 may also correspond to a combination of one or more LANs, WANs, corporate intranets, and/or the public Internet.

Although FIG. 9 only shows six programmable devices, distributed application architectures may serve tens, hundreds, or thousands of programmable devices. Moreover, programmable devices 904a, 904b, 904c, 904d, 904e, 904f (or any additional programmable devices) may be any sort of computing device, such as an ordinary laptop computer, desktop computer, wearable computing device, mobile computing device, head-mountable device (HMD), network terminal, wireless communication device (e.g., a smart phone or cell phone), and so on. In some embodiments, such as indicated with programmable devices 904a, 904b, 904c, programmable devices can be directly connected to network 906. In other embodiments, such as indicated with programmable devices 904d and 904e, programmable devices can be indirectly connected to network 906 via an associated computing device, such as programmable device 904c. In this example, programmable device 904c can act as an associated computing device to pass electronic communications between programmable devices 904d and 904e and network 906. In yet other embodiments, such as shown in programmable device 904f, a computing device can be part of and/or inside a vehicle; e.g., a car, a truck, a bus, a boat or ship, an airplane, etc. In still other embodiments not shown in FIG. 9, a programmable device can be both directly and indirectly connected to network 906.

Server devices 908, 910 can be configured to perform one or more services, as requested by programmable devices 904a-904f. For example, server device 908 and/or 910 can provide content to programmable devices 904a-904f. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 908 and/or 910 can provide programmable devices 904a-904f with access to software for database, search, computation, graphical, audio, video, World Wide Web/Internet utilization, and/or other functions. Many other examples of server devices are possible as well.

Computing Device Architecture

Figure 10:
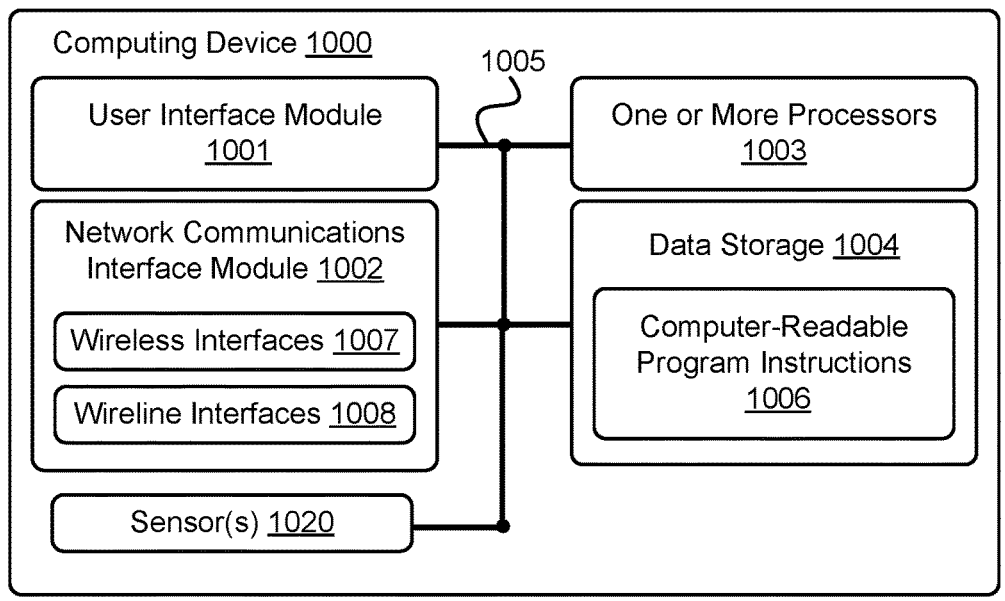
FIG. 10 is a functional block diagram of an example computing device, in accordance with an example embodiment.

FIG. 10 is a functional block diagram of an example computing device 1000, in accordance with an example embodiment. In particular, computing device 1000 shown in FIG. 10 can be configured to perform at least one function of computing device 100, user inputs 230, 310, 410, 510, 610, partial displays 420, 520, graphs 710, 720, 730, 740, 750, settings interface 800, programmable devices 904a, 904b, 904c, 904d, 904e, 904f, network 906, server devices 908, 910, and/or at least one function related to scenarios 102, 202, 500, and/or method 1100.

Computing device 1000 may include a user interface module 1001, a network-communication interface module 1002, one or more processors 1003, data storage 1004, and one or more sensors 1020, all of which may be linked together via a system bus, network, or other connection mechanism 1005.

User interface module 1001 can be operable to send data to and/or receive data from external user input/output devices. For example, user interface module 1001 can be configured to send and/or receive data to and/or from user input devices such as a touch screen, a computer mouse, a keyboard, a keypad, a touch pad, a track ball, a joystick, a camera, a voice recognition module, and/or other similar devices. User interface module 1001 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 1001 can also be configured to generate audible outputs, such as a speaker, speaker jack, audio output port, audio output device, earphones, and/or other similar devices. User interface module 1001 can further be configured with one or more haptic devices that can generate haptic outputs, such as vibrations and/or other outputs detectable by touch and/or physical contact with computing device 1000. In some embodiments, user interface module 1001 can be used to provide a graphical user interface (GUI) for utilizing computing device 1000.

Network-communications interface module 1002 can include one or more wireless interfaces 1007 and/or one or more wireline interfaces 1008 that are configurable to communicate via a network. Wireless interfaces 1007 can include one or more wireless transmitters, receivers, and/or transceivers, such as a Bluetooth™ transceiver, a Zigbee® transceiver, a Wi-Fi™ transceiver, a WiMAX™ transceiver, and/or other similar type of wireless transceiver configurable to communicate via a wireless network. Wireline interfaces 1008 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1002 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation headers and/or footers, size/time information, and transmission verification information such as CRC and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), an Rivest-Shamir-Adelman (RSA) algorithm, a Diffie-Hellman algorithm, a secure sockets protocol such as Secure Sockets Layer SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 1003 can include one or more general purpose processors, and/or one or more special purpose processors (e.g., digital signal processors, graphics processing units, application specific integrated circuits, etc.). One or more processors 1003 can be configured to execute computer-readable program instructions 1006 that are contained in data storage 1004 and/or other instructions as described herein.

Data storage 1004 can include one or more computer-readable storage media that can be read and/or accessed by at least one of one or more processors 1003. The one or more computer-readable storage media can include volatile and/or non-volatile storage components, such as optical, magnetic, organic or other memory or disc storage, which can be integrated in whole or in part with at least one of one or more processors 1003. In some embodiments, data storage 1004 can be implemented using a single physical device (e.g., one optical, magnetic, organic or other memory or disc storage unit), while in other embodiments, data storage 1004 can be implemented using two or more physical devices.

Data storage 1004 can include computer-readable program instructions 1006 and perhaps additional data. In some embodiments, data storage 1004 can additionally include storage required to perform at least part of the herein-described methods, scenarios, and techniques and/or at least part of the functionality of the herein-described devices and networks.

In some embodiments, computing device 1000 can include one or more sensors 1020. Sensors 1020 can be configured to measure conditions in an environment of computing device 1000 and provide data about that environment. For example, sensors 1020 can include one or more of: (i) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and a laser tracker, where the identification sensors can be configured to read identifiers, such as RFID tags, barcodes, QR codes, and/or other devices and/or object configured to be read and provide at least identifying information; (ii) sensors to measure locations and/or movements of computing device 1000, such as, but not limited to, a tilt sensor, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 1000, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about computing device 1000, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 1020 are possible as well.

Example Methods of Operation

FIG. 11 is a flowchart of method 1100, in accordance with an example embodiment. Method 1100 can be executed by a computing device, such as computing device 100 and/or computing device 1000. Method 1100 can begin at block 1110, where the computing device can present a symbol queue on a screen of the computing device, where the symbol queue includes a particular symbol, such as discussed above in at least the context of FIGS. 2-6.

At block 1120, the computing device can receive user input to move through the symbol queue, such as discussed above in at least the context of FIGS. 2-6. In some embodiments, the user input to move through the symbol queue can include one or more of: user input to scroll up in the symbol queue and user input to scroll down in the symbol queue, such as discussed above in at least the context of FIGS. 2-6 and 8. In particular of these embodiments, a first haptic feedback is associated with user input to scroll up in the symbol queue, and where a second haptic feedback is associated with the user input to scroll down in the symbol queue, such as discussed above in at least the context of FIGS. 2-6 and 8. In other embodiments, the computing device can further include a touch interface; then the user input to move through the symbol queue can be received using the touch interface, such as discussed above in at least the context of FIG. 2.

At block 1130, the computing device can, in response to the user input, animate the particular symbol on the screen by at least presenting an expanded item display that includes at least one of the particular symbol and a particular informational item associated with the particular symbol, such as discussed above in at least the context of FIGS. 2-6. In some embodiments, the user input includes user input to scroll up in the symbol queue; then, animating the particular symbol can include: updating the symbol queue to remove the particular symbol; and presenting the updated symbol queue on the screen, such as discussed above in at least the context of FIGS. 2-6 and 8. In other embodiments, the particular informational item relates to one or more of: receipt of one or more messages, sending one or more messages, availability of one or more software downloads, a reminder of an event, one or more particular locations, one or more particular persons and/or entities, and one or more particular computing devices, such as discussed above in at least the context of FIG. 2.

In still other embodiments, the screen can include an item display region that is visually distinct from the symbol queue; then, presenting the expanded item display can include presenting the expanded item display in the item display region, such as discussed above in at least the context of FIGS. 2-6. In even other embodiments, the user input to move through the symbol queue can include user input that causes the computing device to continuously scroll through expanded items in the item display region, such as discussed above in at least the context of FIGS. 2-6. In particular of these embodiments, animating the particular symbol on the screen can include: in response to the user input to continuously scroll through expanded items in the item display region, updating the display of the symbol queue in coordination with continuously scrolling the expanded items in the item display region, such as discussed above in at least the context of FIGS. 2-6.

At block 1140, the computing device can generate haptic feedback that is synchronized with animating the particular symbol on the screen, such as discussed above in at least the context of FIGS. 2-4, 7, and 8. In some embodiments, animating the particular symbol can occur over a time period, and generating the haptic feedback can include generating the haptic feedback at a predetermined time within the time period, such as discussed above in at least the context of FIGS. 2-4 and 7. In particular of these embodiments, the predetermined time is one or more of: a beginning of the time period, an end of the time period, and a particular predetermined time between the beginning and the end of one time period, such as discussed above in at least the context of FIG. 7. In other particular of these embodiments, generating the haptic feedback at one or more predetermined times within the time period comprises generating haptic feedback that varies in duration, intensity, and waveform at a plurality of predetermined times during the time period, such as discussed above in at least the context of FIG. 7.

In other embodiments, generating haptic feedback that is synchronized with animating the particular symbol on the screen can include: continuously scrolling an amount of expanded items in the item display region; determining that the amount of expanded items exceeds a threshold amount; and in response to determining that the amount of expanded items exceeds the threshold amount, generating the haptic feedback, such as discussed above in at least the context of FIG. 2.

In still other embodiments, generating haptic feedback that is synchronized with animating the particular symbol on the screen can include continuously scrolling the expanded items by a scrolling distance within the item display region; determining that the scrolling distance exceeds a threshold scrolling distance; and in response to determining the scrolling distance exceeds the threshold scrolling distance, generating the haptic feedback, such as discussed above in at least the context of FIG. 2.

In even other embodiments, generating haptic feedback that is synchronized with animating the particular symbol on the screen comprises generating haptic feedback that changes progressively while moving through the symbol queue, such as discussed above in at least the context of FIG. 1.

In some embodiments, the user input includes user input to scroll down in the symbol queue; then, method 1100 can further include: updating the symbol queue to add the particular symbol; removing the expanded item display from the screen; and presenting the updated symbol queue on the screen, such as discussed above in at least the context of FIGS. 4 and 5.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
presenting a symbol queue on a screen of a computing device, the symbol queue including a particular symbol, the computing device comprising a haptic actuator;
receiving, at the computing device, user input to scroll through the symbol queue; and
in response to the user input to scroll through the symbol queue, animating the particular symbol on the screen by at least:
presenting an expanded item display that includes the particular symbol and a particular informational item associated with the particular symbol on the screen; and
synchronizing haptic feedback with animating the particular symbol by the haptic actuator providing one or more haptic pulses of haptic feedback while the expanded item display is presented on the screen.

2. The method of claim 1, wherein the user input to scroll through the symbol queue includes one or more of: user input to scroll up in the symbol queue and user input to scroll down in the symbol queue.

3. The method of claim 2, wherein the user input to scroll through the symbol queue comprises user input to scroll up in the symbol queue, and wherein animating the particular symbol further comprises:
updating the symbol queue to remove the particular symbol; and
presenting the updated symbol queue on the screen.

4. The method of claim 2, wherein the user input to scroll through the symbol queue comprises user input to scroll down in the symbol queue, and wherein the method further comprises:
updating the symbol queue to add the particular symbol;
removing the expanded item display from the screen; and
presenting the updated symbol queue on the screen.

5. The method of claim 2, wherein a first haptic feedback is associated with user input to scroll up in the symbol queue, and wherein a second haptic feedback is associated with the user input to scroll down in the symbol queue.

6. The method of claim 1, wherein synchronizing haptic feedback with animating the particular symbol on the screen comprises providing haptic feedback that changes progressively while scrolling through the symbol queue.

7. The method of claim 1, wherein animating the particular symbol occurs over a time period, and wherein synchronizing the haptic feedback with animating the particular symbol comprises providing the haptic feedback at one or more predetermined times within the time period.

8. The method of claim 7, wherein the one or more predetermined times are one or more of: a beginning of the time period, an end of the time period, and a particular predetermined time between the beginning and the end of one time period.

9. The method of claim 7, wherein providing the haptic feedback at one or more predetermined times within the time period comprises generating haptic feedback that varies in duration, intensity, and waveform at a plurality of predetermined times during the time period.

10. The method of claim 1, wherein the screen comprises an item display region that is visually distinct from the symbol queue, and wherein synchronizing haptic feedback with animating the particular symbol comprises presenting the expanded item display in the item display region.

11. The method of claim 10, wherein the user input to scroll through the symbol queue comprises user input that causes the computing device to continuously scroll through expanded items in the item display region.

12. The method of claim 11, wherein animating the particular symbol on the screen comprises:
in response to the user input to continuously scroll through expanded items in the item display region, updating the display of the symbol queue in coordination with continuously scrolling the expanded items in the item display region.

13. The method of claim 11, wherein synchronizing haptic feedback with animating the particular symbol on the screen further comprises:
continuously scrolling an amount of expanded items in the item display region;
determining that the amount of expanded items exceeds a threshold amount; and
in response to determining that the amount of expanded items exceeds the threshold amount, generating the haptic feedback.

14. The method of claim 11, wherein synchronizing haptic feedback with animating the particular symbol on the screen further comprises:
continuously scrolling the expanded items by a scrolling distance within the item display region;
determining that the scrolling distance exceeds a threshold scrolling distance; and
in response to determining the scrolling distance exceeds the threshold scrolling distance, generating the haptic feedback.

15. The method of claim 1, wherein the particular informational item relates to one or more of: receipt of one or more messages, sending one or more messages, availability of one or more software downloads, a reminder of an event, one or more particular locations, one or more particular persons and/or entities, and one or more particular computing devices.

16. The method of claim 1, wherein the computing device further comprises a touch interface, and wherein the user input to scroll through the symbol queue is received using the touch interface.

17. A computing device, comprising:
one or more processors;
a haptic actuator;
a screen; and
data storage including at least computer-executable instructions stored thereon that, when executed by the one or more processors, cause the computing device to perform functions comprising:
presenting a symbol queue on the screen, the symbol queue including a particular symbol;
receiving user input to scroll through the symbol queue;
in response to the user input to scroll through the symbol queue, animating the particular symbol on the screen by at least:
presenting an expanded item display that includes the particular symbol and a particular informational item associated with the particular symbol on the screen; and
synchronizing haptic feedback with animating the particular symbol by the haptic actuator providing one or more haptic pulses of haptic feedback while the expanded item display is presented on the screen.

18. The computing device of claim 17, wherein the user input to scroll through the symbol queue includes one or more of: user input to scroll up in the symbol queue and user input to scroll down in the symbol queue.

19. The computing device of claim 18, wherein the user input to scroll through the symbol queue comprises user input to scroll up in the symbol queue, and wherein animating the particular symbol further comprises:
  updating the symbol queue to remove the particular symbol; and
  presenting the updated symbol queue on the screen.

20. The computing device of claim 18, wherein the user input to scroll through the symbol queue comprises user input to scroll down in the symbol queue, and wherein the functions further comprise:
  updating the symbol queue to add the particular symbol;
  removing the expanded item display from the screen; and
  presenting the updated symbol queue on the screen.

21. The computing device of claim 18, wherein a first haptic feedback is associated with user input to scroll up in the symbol queue, and wherein a second haptic feedback is associated with the user input to scroll down in the symbol queue.

22. A non-transitory computer readable medium having stored thereon instructions, that when executed by one or more processors of a computing device, cause the computing device to perform functions comprising:
  presenting a symbol queue on a screen of the computing device, the symbol queue including a particular symbol, wherein the computing device comprises a haptic actuator;
  receiving user input to scroll through the symbol queue;
  in response to the user input to scroll through the symbol queue, animating the particular symbol on the screen by at least:
    presenting an expanded item display that includes the particular symbol and a particular informational item associated with the particular symbol on the screen; and
    synchronizing haptic feedback with animating the particular symbol by the haptic actuator providing one or more haptic pulses of haptic feedback while the expanded item display is presented on the screen.

* * * * *